(12) United States Patent  
Wakabayashi et al.

(10) Patent No.: US 9,047,883 B2  
(45) Date of Patent: Jun. 2, 2015

(54) OPTICAL PICKUP DEVICE, OPTICAL INFORMATION DEVICE, AND INFORMATION PROCESSING DEVICE

(71) Applicant: PANASONIC CORPORATION, Osaka (JP)

(72) Inventors: Kanji Wakabayashi, Kyoto (JP); Kouji Ieki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/816,577

(22) PCT Filed: Sep. 24, 2012

(86) PCT No.: PCT/JP2012/006046  
§ 371 (c)(1),  
(2) Date: Feb. 12, 2013

(87) PCT Pub. No.: WO2013/046621  
PCT Pub. Date: Apr. 4, 2013

(65) Prior Publication Data  
US 2014/0119169 A1    May 1, 2014

(30) Foreign Application Priority Data

Sep. 30, 2011   (JP) .................................. 2011-216346

(51) Int. Cl.  
*G11B 7/00* (2006.01)  
*G11B 7/09* (2006.01)  
(Continued)

(52) U.S. Cl.  
CPC ............ *G11B 7/0908* (2013.01); *G11B 7/0935* (2013.01); *G11B 7/1353* (2013.01); *G11B 7/1374* (2013.01); *G11B 7/13922* (2013.01); *G11B 2007/0006* (2013.01)

(58) Field of Classification Search  
USPC ............ 369/13.32, 13.3, 44.11–44.22, 44.37, 369/112.01, 112.08, 112.11, 112.13, 369/112.18, 112.2–112.23, 121, 135, 149, 369/244.1, 253  
See application file for complete search history.

(56) References Cited

U.S. PATENT DOCUMENTS 8,045,425 B2 * 10/2011 Torii .......................... 369/44.14  
8,570,674 B2 * 10/2013 Choi et al. .................... 359/820  
(Continued)

FOREIGN PATENT DOCUMENTS

JP     10-177740     6/1998  
JP     2004-146034   5/2004  
(Continued)

OTHER PUBLICATIONS

International Search Report issued Nov. 13, 2012 in International (PCT) Application No. PCT/JP2012/006046.

*Primary Examiner* — Thang Tran  
*Assistant Examiner* — Dionne Pendleton  
(74) *Attorney, Agent, or Firm* — Wenderoth, Lind & Ponack, L.L.P.

(57) ABSTRACT

An optical pickup device includes a single objective lens that focuses a light beam to irradiate an optical disk, and an objective lens actuator that drives the objective lens. The objective lens actuator includes a lens holder that holds the objective lens. Two gaps (Ga, Gb) are formed between the lens holder and the objective lens. In an xy plane in which the center of the objective lens is defined as an origin, the tracking direction is defined as an y axis, and the tangential direction of tracks of the optical disk is defined as an x axis, the gap (Ga) is positioned at least in the first quadrant of the xy plane, and the gap (Gb) is positioned at least in the third quadrant of the xy plane.

15 Claims, 16 Drawing Sheets

(51) Int. Cl.
*G11B 7/1374* (2012.01)
*G11B 7/1353* (2012.01)
*G11B 7/1392* (2012.01)

(56) References Cited

U.S. PATENT DOCUMENTS

| | | | |
|---|---|---|---|
| 2002/0060974 | A1* | 5/2002 | Murata et al. ............ 369/112.23 |
| 2004/0066714 | A1 | 4/2004 | Ikawa et al. |
| 2004/0165288 | A1* | 8/2004 | Daikoku ........................ 359/819 |
| 2006/0168607 | A1* | 7/2006 | Ohkuma et al. .............. 720/683 |
| 2010/0067351 | A1* | 3/2010 | Yabe et al. ............... 369/112.23 |
| 2010/0067356 | A1* | 3/2010 | Fujii et al. ................ 369/112.24 |
| 2010/0271927 | A1* | 10/2010 | Furuichi .................. 369/112.24 |
| 2011/0090781 | A1* | 4/2011 | Nakamura et al. ....... 369/112.23 |
| 2011/0267935 | A1* | 11/2011 | Yasumoto ................ 369/112.23 |
| 2011/0299377 | A1* | 12/2011 | Hanashiro et al. ....... 369/112.23 |
| 2012/0134255 | A1* | 5/2012 | Ito ............................ 369/112.23 |
| 2013/0163400 | A1* | 6/2013 | Nomura et al. .......... 369/112.23 |

FOREIGN PATENT DOCUMENTS

| | | |
|---|---|---|
| JP | 2005-259308 | 9/2005 |
| JP | 2006-164416 | 6/2006 |
| JP | 2008-226326 | 9/2008 |
| JP | 2009-277318 | 11/2009 |

* cited by examiner

OPTICAL PICKUP DEVICE, OPTICAL INFORMATION DEVICE, AND INFORMATION PROCESSING DEVICE

BACKGROUND OF THE INVENTION

1. Technical Field

The present invention relates to an optical pickup device that records and/or reproduces information on/from a disk-shaped recording medium, an optical information device using the optical pickup device, and an information processing device using the optical information device.

2. Background Art

Various optical pickup devices for reproducing and recording information from and to CD (compact discs) and DVD (digital versatile discs), which are optical disks representing the conventional disk-shaped recording medium, and recently on BD (Blu-ray Discs) have been developed, manufactured and widely spread.

The wavelength of the light source used in CD or DVD is about 780 nm and about 660 nm, whereas a BD is an optical disk of a high-density and high-capacity type that uses a laser light source with the so-called blue-violet light having a wavelength of about 405 nm as a light source. In the case of such an optical disk, it is necessary to increase the NA of an objective lens over the NA of an objective lens for DVD in order to perform recording and reproduction with higher density. A high-performance objective lens with a small wavefront aberration is needed, and specifications required for optical pickup devices have become increasingly severe.

Further, in the aforementioned optical pickup devices of a high-density and high-capacity type, highly accurate focusing servo and tracking servo are required and a larger servo gain is needed. As a result, the amount of heat generated by the objective lens drive system will apparently also increase. From this standpoint, the improvement of temperature characteristics of optical pickup devices is required.

In particular, in compatible optical pickup devices suitable for using a plurality of standards, namely, the high-density and high-capacity BD and also the conventional optical disks such as DVD, temperature compensation of spherical aberration and astigmatism of objective lenses is difficult, and the demand for optical pickup devices with small spherical aberration and astigmatism caused by temperature changes, that is, with good temperature characteristic, has grown.

Meanwhile, the reduction in cost of optical pickup devices is always sought for, and the demand for multiple-wavelength compatible objective lenses for realizing compatible pickup devices suitable for BD, DVD, and CD with a single objective lens has also been growing. In order to meet this demand, an objective lens in which a fine diffraction grating is formed on the lens surface has been suggested, and the transition to resin lens materials is necessary to realize such a compatible optical lens. Therefore, optical pickup devices realizing good temperature characteristic are also increasingly required from the standpoint of correspondence to the transition to resin objective lenses.

In some conventional optical pickup devices, an objective lens actuator is used that is configured to have a large distance from the objective lens carried at the end of a lens holder to a drive coil which is a heat generation source (see, for example, Patent Document 1). FIG. 18 is a perspective view illustrating the configuration of the objective lens actuator of the conventional optical pickup device described in Patent Document 1.

In FIG. 18, an objective lens 101 is held at one end of a lens holder 102, focusing coils 104R, 104L and tracking coils 105R, 105L are fixedly attached to the inner sides of through holes configured at the other end side of the lens holder 102, and a movable unit 115 is constituted by those members. Six linear support members 103a to 103e on one side thereof that can undergo elastic deformation are fixed to the outer end of the lens holder 102, and the support members on the other side thereof are fixed to a fixed unit 113. The fixed unit 113 is fixed to a base 114. The movable unit 115 is elastically supported by the fixed unit 113 so that the movable unit 115 can perform translatable movement in a focusing direction Fo and a tracking direction Tr and rotate in a radial tilting direction Ti. The arrow S shows the circumferential direction of an optical disk (not shown in the figure).

A yoke 109 is disposed at a position shown by a broken line in the figure. A magnet 110 is mounted on a yoke 106, a magnet 111 is mounted on a yoke 107, and a magnet 112 is mounted on a yoke 108. The magnet 110 is disposed opposite the magnet 112, and the magnet 111 is disposed opposite the magnet 112. The focusing coil 104R and the tracking coil 105R are disposed in a magnetic gap between the magnet 110 and the magnet 112, and the focusing coil 104L and the tracking coil 105L are disposed in a magnetic gap between the magnet 111 and the magnet 112. Where the focusing coils 104R, 104L are energized, the objective lens 101 is driven in the focusing direction Fo, and where the tracking coils 105R, 105L are energized, the objective lens is driven in the tracking direction Tr.

Therefore, the magnet 112 and the yoke 108 are disposed between the objective lens 101 and the focusing coils 104R, 104L and the tracking coils 105R, 105L, which are heat generation sources. Since the heat-generation sources and the objective lens 101 are thus disposed at spatially separated positions, the heat generated by the focusing coils 104R, 104L and the tracking coils 105R, 105L flows to the objective lens 101 by thermal conduction via the lens holder 102, and the amount of this heat is very small. As a result, the rise in temperature of the objective lens 101 is small and temperature changes are also small.

An optical pickup device has also been suggested (see Patent Document 2) in which two objective lenses are disposed between drive coils disposed at two mutually opposing side surfaces of a lens holder and the distance from the objective lenses to the drive point is reduced, thereby satisfying the high-order resonance frequency necessary for the objective lens actuator. In addition, the position of the lens bonding unit of the lens holder is optimized to level the inflow of heat by thermal conduction. FIG. 19 is a top view illustrating the configuration of the objective lens actuator of the conventional optical pickup device described in Patent Document 2.

In FIG. 19, a lens holder 121 is supported so that the lens holder can be displaced within a predetermined range with respect to a suspension holder 122, and an objective lens 133 for BD and an objective lens 134 for DVD/CD are disposed at the lens holder 121 along a tangential direction S, which is the direction perpendicular to the tracking direction Tr. The objective lens 133 for BD is supported by objective lens support surfaces 130a, 130b, 130c of the lens holder 121, and fixed by an adhesive injected into bonding sections 131a, 131b, 131c. Further, the objective lens 134 for DVD/CD is supported by an objective lens support surface 135 of the lens holder 121 and fixed by an adhesive injected into bonding sections 132a, 132b, 132c. In the locations fixed by the adhesives, the degree of close attachment of the bonding sections 131a, 131b, 131c of the lens holder 121 and the objective lens 133 for BD is high, and the heat most easily flows from the lens holder 121 to the objective lens 133 for BD.

Focusing coils 123, 124, tracking coils 125, 126, and tilting coils 127, 128 are fixedly attached one by one to respective opposing side surfaces along the tangential direction S of the lens holder 121.

In this configuration, the bonding sections 131a, 131b, 131c are disposed as described hereinbelow. The bonding section 131a is disposed at a position that is not close to a set of the focusing coil 123 and the tilting coil 127 and also not too close to the tracking coil 125. In other words, the bonding section 131a is disposed at a position that is closer to the tracking coil 125 than to the set of the focusing coil 123 and the tilting coil.

With such a configuration, when an electric current flows to the focusing coils 123, 124, tracking coils 125, 126, and tilting coils 127, 128 and the lens holder 121 is driven, the bonding section 131a can be disposed at a position with a low temperature between the set of the focusing coil 123 and the tilting coil 127 in which the temperature rises easily and the tracking coil 125 in which the rise in temperature is less than in the aforementioned set.

The bonding sections 131b, 131c are disposed at positions with a temperature substantially equal to that of the position of the bonding section 131a on the lens holder 121. As a result, the amount of heat flowing from the bonding sections 131a, 131b, 131c provided at positions with substantially the same temperature to the objective lens 133 is also substantially the same, uneven deformation of the objective lens 133 is unlikely to occur, and the occurrence of astigmatism of the light transmitted by the objective lens 133 can be inhibited.

However, in the conventional objective lens actuator shown in FIG. 18, since the distance from the objective lens 101 to the focusing coils 104R, 104L and the tracking coils 105R, 105L is large, the distance between the objective lens 101 and the heat generation source is large and, at the same time, the distance from the objective lens 101 to the drive point is also large. Therefore, the inherent oscillation frequency of the drive transmission system of the objective lens 101 is low. In particular, when an objective lens for BD or a multiple-frequency compatible objective lens for DVD/CD, including BD, is used, the NA is increased to increase density and the allowed focusing residual decreases. Therefore, the necessary servo gain increases. As a result, a transition to a band higher than the high-order resonance frequency during the drive is required for the objective lens actuator.

From the above-described standpoint, in the conventional configuration with a large distance from the objective lens 101 to the drive point, the necessary high-order resonance frequency of the objective lens actuator cannot be obtained. The resultant problem is that sufficient light spot focusing performance cannot be obtained due to defocusing, and the system is not suitable for high-density recording and reproduction.

In the conventional objective lens actuator shown in FIG. 19, two objective lenses, namely, the objective lens 133 for BD and the objective lens 134 for DVD/CD, are installed on the lens holder 121. The resultant problem is that the lens holder 121 is increased in size and the optical pickup device is also increased in size. In addition, since it is necessary to use two objective lenses, namely, the objective lens 133 for BD and the objective lens 134 for DVD/CD, the cost of the device rises.

Patent Document 1: Japanese Patent Application Publication No. 2004-146034

Patent Document 2: Japanese Patent Application Publication No. 2006-164416

SUMMARY OF THE INVENTION

It is an object of the present invention to provide an optical pickup device, an optical information device, and an information processing device that make it possible to obtain a good focusing characteristic, realize stable high-density recording and reproduction, reduce the device cost, and reduce the device in size and thickness by using a single objective lens compatible with disk-shaped recording media of a plurality of types.

An optical pickup device according to one aspect of the present invention comprises: a light source that emits a light beam of a predetermined wavelength; a single objective lens that focuses the light beam from the light source to irradiate a disk-shaped recording medium; an objective lens actuator that drives the objective lens; a photodetector that receives, via the objective lens, a light beam reflected by a recording surface of the disk-shaped recording medium to converts the received light into an electric signal; and an optical base that holds the light source, the objective lens actuator, and the photodetector, wherein the objective lens actuator comprises: a lens holder that holds the objective lens; a support mechanism that supports the lens holder so that the lens holder is movable in a focusing direction, which is a direction perpendicular to the disk-shaped recording medium, and a tracking direction, which is a radial direction of the disk-shaped recording medium; a focusing coil that is fixed to the lens holder and drives the lens holder in the focusing direction; a tracking coil that is fixed to the lens holder and drives the lens holder in the tracking direction; an actuator base that holds one end of the support mechanism; and a magnet that is held on the actuator base and disposed at a position opposing the focusing coil and/or the tracking coil, and also applies a magnetic field to the focusing coil and/or the tracking coil, a first gap and a second gap are formed between the lens holder and the objective lens, and when the disk-shaped recording medium rotates clockwise, and in an xy plane in which the center of the objective lens is defined as an origin, the tracking direction is defined as an y axis, and the tangential direction of tracks of the disk-shaped recording medium is defined as an x axis, a center side of the disk-shaped recording medium is defined as a positive direction for the y axis, a direction obtained by rotating the positive direction of the y axis clockwise through 90° is defined as a positive direction for the x axis, and four regions obtained by dividing the xy plane by the x axis and the y axis are defined as a first quadrant, a second quadrant, a third quadrant, and a fourth quadrant in the counterclockwise direction, the first gap is positioned at least in the first quadrant, and the second gap is positioned at least in the third quadrant.

With the above-described optical pickup device, it is possible to obtain a good focusing characteristic, realize stable high-density recording and reproduction, reduce the device cost, and reduce the device in size and thickness by using a single objective lens compatible with disk-shaped recording media of a plurality of types.

DETAILED DESCRIPTION OF THE INVENTION

Figure 19:
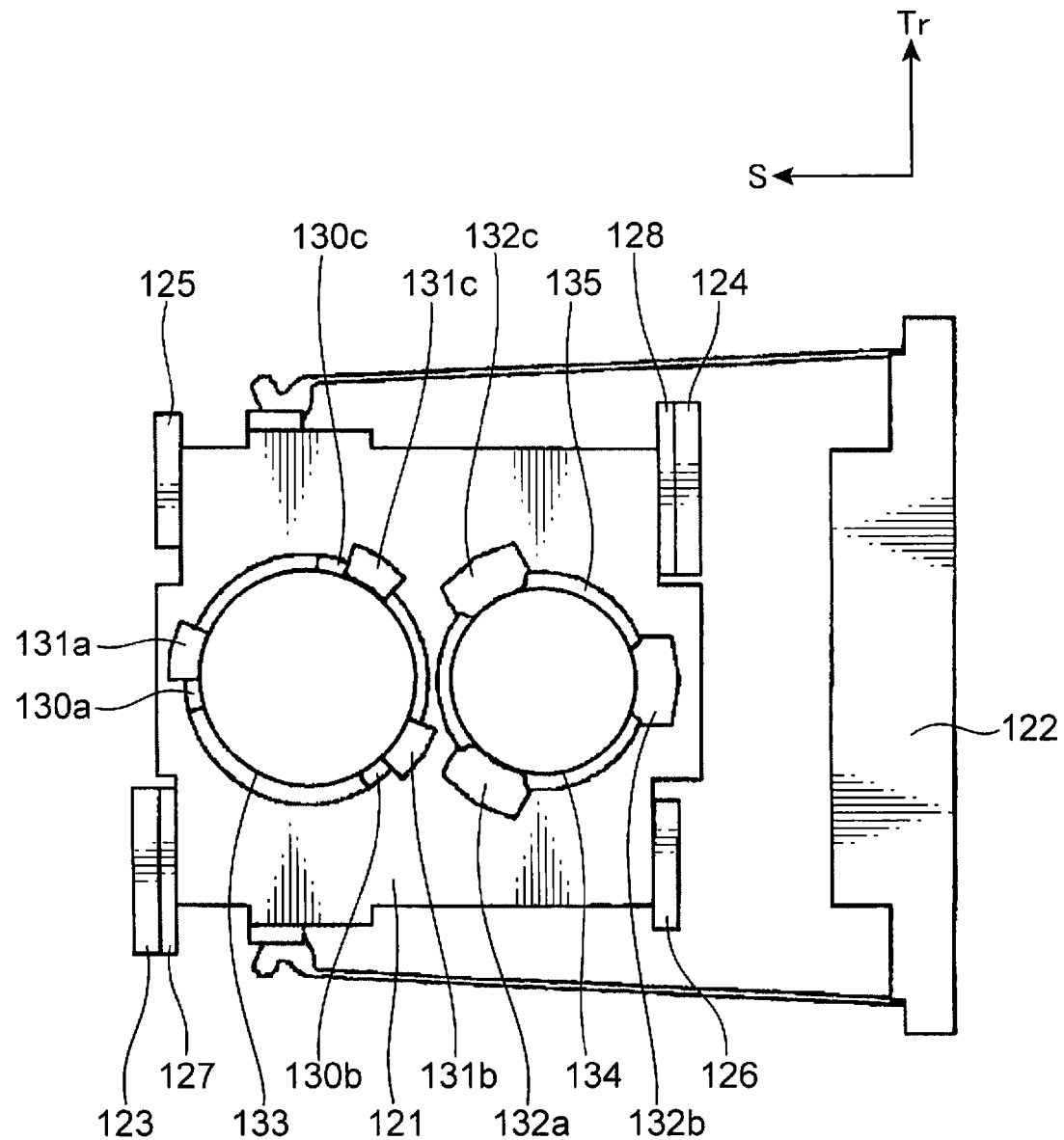
FIG. 19 is a top view illustrating the configuration of the objective lens actuator of another conventional optical pickup device.

Explained below are the problems associated with the objective lens actuator for the conventional optical pickup device that have been newly discovered by the inventors of the present application. In the conventional configuration shown in FIG. 19, when the two objective lenses, namely, the objective lens 133 for BD and the objective lens 134 for DVD/CD, are installed on the lens holder 121, where the distance between the coil group constituted by the focusing coil 123, tilting coil 127, and tracking coil 125 disposed on one side surface of the lens holder 121 and the objective lens 133 for BD is compared with the distance between the coil group constituted by the focusing coil 124, tilting coil 128, and tracking coil 126 disposed on the other side surface and the objective lens 133 for BD, it can be found that the separation between the coil group disposed on the other side surface and the objective lens 133 for BD is larger.

In the case of such a configuration, the positions of the bonding sections 131a, 131b, 131c are closer to each other in the coil group disposed on the one side surface than in the coil group disposed on the other side surface. Therefore, the amount of heat generated by the coil group disposed on the other side surface makes a very small contribution to the rise in temperature of the objective lens 133 for BD.

Further, in the configuration in which two objective lenses 133, 134 are installed, the volume of the lens holder 121 is increased. Therefore, thermal capacity of the lens holder 121 is increased and the inflow of heat to the objective lens 133 for BD is small.

Therefore, by optimizing the position of the bonding section 131a, it is possible to level the inflow of heat from the coil group disposed on the one side surface and reduce the observed rise in temperature of the objective lens 133 for BD.

However, when only a single objective lens that is compatible with BD and DVD (and/or CD) is installed instead of the two objective lenses 133, 134 at the lens holder, the distance between the objective lens and the coil group disposed on one side surface is equal to the distance between the objective lens and the coil group disposed on the other side surface, and the objective lens is close to each coil group.

With such a configuration, the inflow of heat to the single objective lens is twice that in the configuration in which two objective lenses are installed.

Further, since the volume of the lens holder is about half that in the configuration in which two objective lenses are installed, thermal capacity of the lens holder is also reduced by a factor of about half, and the observed rise in temperature of the lens holder is increased by a factor of about two.

Therefore, although by optimizing the positions of the bonding sections and leveling the inflow of heat to the objective lens it is possible to reduce the variation in temperature distribution of the objective lens, the amount of heat flowing into the objective lens is large and therefore, the observed rise in temperature of the objective lens increases.

In particular, since air is retained below the objective lens, the amount of radiated heat is decreased and the temperature is further increased.

The problems encountered when the observed rise in temperature is large in a state in which the variation in temperature distribution of the objective lens is suppressed, are that spherical aberration appears on the light spot, sufficient focusing characteristic cannot be obtained, and the system is not suitable for high-density recording and reproduction.

In particular, with a single resin objective lens compatible with BD and DVD (and/or CD), variations in spherical aberration caused by temperature variations are large and a spherical aberration equal to or greater than 5 m$\lambda$ per 1° C. is generated.

The spherical aberration caused by variations in temperature can be corrected by moving a collimator lens in the optical axis direction according to the variations in temperature of the objective lens, but where the rise in temperature of the objective lens is large, as described hereinabove, in particular, when a resin objective lens is installed, variations in spherical aberration caused by variations in temperature are large and the motion range of the collimator lens becomes very large. As a result, the motion range of the collimator lens corresponding to such variations in temperature is difficult to ensure, or the optical pickup device should be increased in size, which greatly degrades the device merchantability and becomes a fatal problem for the optical pickup device.

Another significant problem is that where the larger rise in temperature of the objective lens occurs, defects such as hair cracks and white turbidity appear in the surface coating, and such defects eventually lead to the lens fracture.

The embodiments of the present invention resolve the problems associated with the conventional optical pickup devices, including the above-described newly discovered problems. The embodiments of the present invention will be described below with reference to the appended drawings.

Embodiment 1

Figure 1:
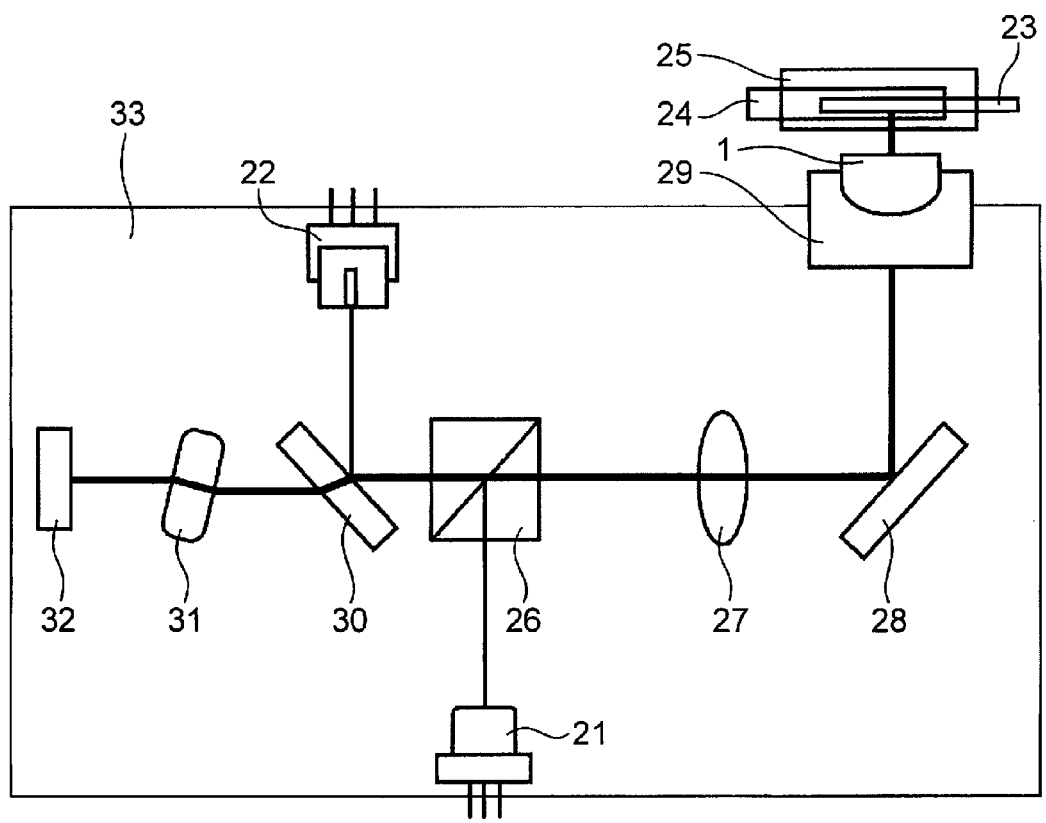
FIG. 1 is a schematic diagram illustrating the schematic configuration of the optical pickup device in Embodiment 1 of the present invention.
Figure 2:
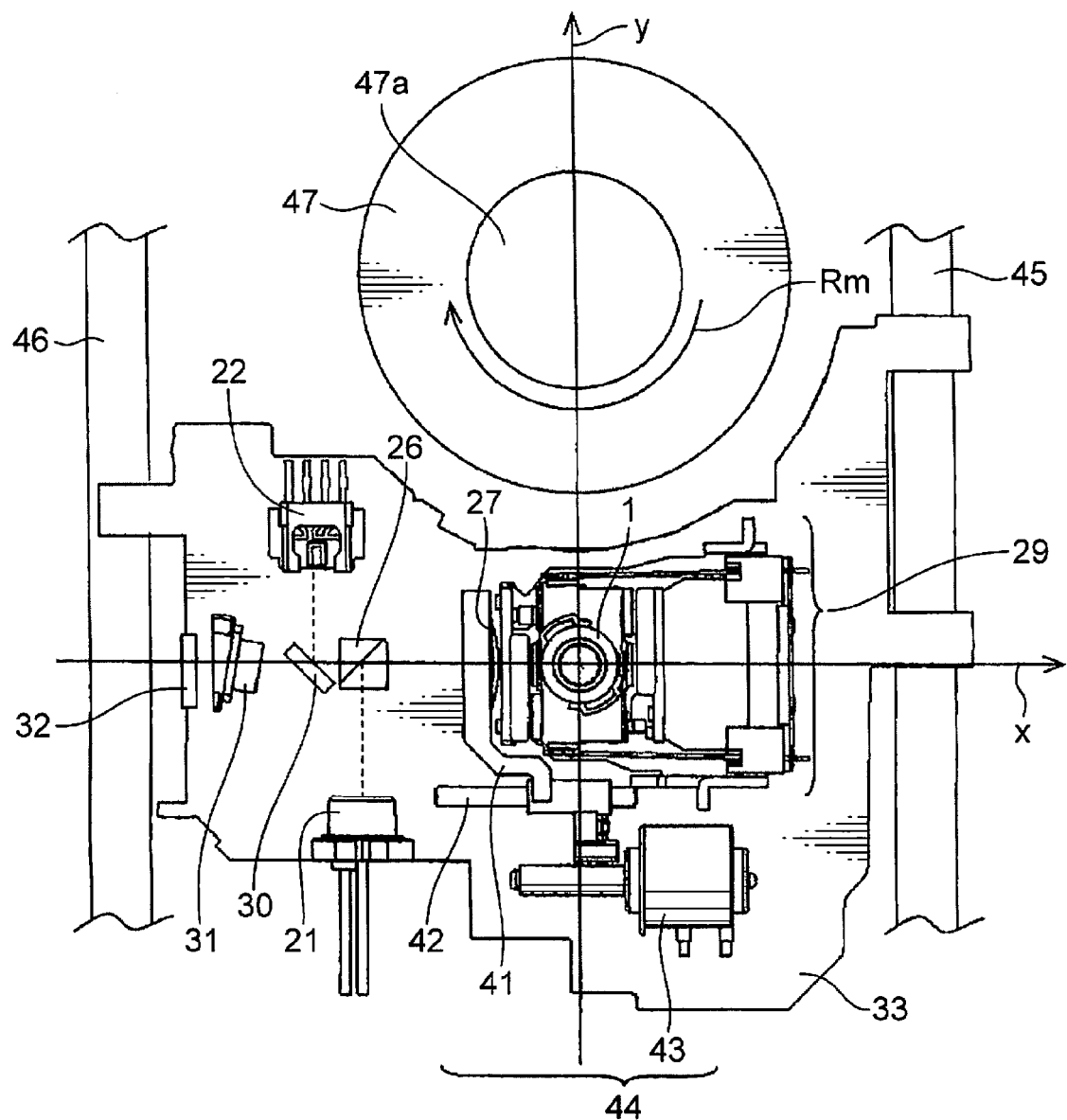
FIG. 2 is a top view illustrating the specific configuration of the optical pickup device shown in FIG. 1.

FIG. 1 is a schematic diagram illustrating the schematic configuration of the optical pickup device according to Embodiment 1 of the present invention. FIG. 2 is a top view illustrating the specific configuration of the optical pickup device shown in FIG. 1.

The optical pickup device shown in FIGS. 1 and 2 includes an objective lens 1, a blue semiconductor laser unit 21, a red and infrared semiconductor laser unit 22, a beam splitter 26, a collimator lens 27, a mirror 28, an objective lens actuator 29, a plate beam splitter 30, a detection lens 31, a photodetector 32, and an optical base 33. Further, as shown in FIG. 2, the optical pickup device is also provided with a CL (collimator lens) actuator 44. The CL actuator 44 includes a CL holder 41, a CL actuator spindle 42, and a stepping motor 43.

In FIGS. 1 and 2, the blue semiconductor laser unit 21 is held at the optical base 33. A light beam emitted from the blue semiconductor laser unit 21 has a wavelength of 400 nm to 415 nm. In the present embodiment, the blue semiconductor laser unit 21 is configured, for example, to emit a light beam with a wavelength of about 405 nm. The light having the aforementioned wavelength typically has a blue-violet color.

The red and infrared semiconductor laser unit 22 is held at the optical base 33. A light beam emitted from the red and infrared semiconductor laser unit 22 has a wavelength of 640 nm to 800 nm. The red and infrared semiconductor laser unit 22 is configured to emit a light beam of a single wavelength, or emit light beams of a plurality of wavelengths. In the present embodiment, the red and infrared semiconductor laser unit 22 is configured to emit, for example, a light beam with a wavelength of about 660 nm, which corresponds to DVD, and a light beam with a wavelength of about 780 nm, which corresponds to CD.

The objective lens 1 is a multiple-wavelength compatible objective lens corresponding to a plurality of wavelengths including at least a wavelength of 405 nm and has a fine diffraction structure having a wavelength selection function on the lens surface. This diffraction structure can set any focal position depending on the wavelength of the light beam transmitted by the lens. In the present embodiment, for example, a three-wavelength compatible objective lens corresponding to three wavelengths including a wavelength of about 660 nm and a wavelength of about 780 nm in addition to a wavelength of about 405 nm is used as the objective lens 1. The diffraction structure of the objective lens 1 is configured such that the operation distance increases in the order of infrared light, red light, and blue light. For example, the operation distance is set to about 0.3 mm for the infrared light, about 0.44 mm for the red light, and about 0.5 mm for the blue light.

Further, the objective lens 1 is a resin lens formed by molding a resin. In the present embodiment, the objective lens is molded, for example, by using a cycloolefin polymer, which is a resin obtained by polymerization of a cycloolefin.

A BD 23, a DVD 24, and a CD 25 shown in FIG. 1 are optical disks which are examples of disk-shaped recording medium. Only one optical disk from among the BD 23, DVD 24, and CD 25 is used at a time. In FIG. 1, the BD 23, DVD 24, and CD 25 are shown together to illustrate the difference in operation distance.

In the present embodiment, an optical pickup device is described that uses a three-wavelength compatible objective lens in which light beams of three wavelengths, namely, a light beam for BD with a wavelength of about 405 nm, a light beam for DVD with a wavelength of about 660 nm, and a light beam with a wavelength of about 780 nm are collected by the single objective lens 1 to perform recording and reproduction of information on and from optical disks (BD 23, DVD 24, or CD 25) corresponding to a respective wavelength.

The blue light beam emitted from the blue semiconductor laser unit 21 is reflected by the beam splitter 26 and directed toward the collimator lens 27. In this case, the collimator lens 27 is set such as to convert the light beam to a predetermined exitance. As shown in FIG. 2, the collimator lens 27 is fixed to the CL holder 41, and the CL holder 41 is held to be movable with respect to the CL actuator spindle 42 and the rotating shaft of the stepping motor 43 (this configuration will be described below in greater detail). The collimator lens 27 is installed at the CL actuator 44 and driven in the optical axis direction by the stepping motor 43. The position of the collimator lens 27 can thus be changed and therefore any value of the light beam exitance can be selected. Therefore, a focused light spot corresponding to the different in thickness of the base material of each layer of the optical disk (BD 23) having a multiple-layer information recording surface can be generated.

The light beam that has been transmitted by the collimator lens 27 is bent by the mirror 28 and directed toward the objective lens 1 installed on the objective lens actuator 29. The blue light beam converged by the objective lens 1 is collected on the information recording surface of the BD 23 at an operation distance of about 0.5 mm.

The light reflected from the information recording surface of the BD 23 is transmitted by the objective lens 1, reflected by the mirror 28, and transmitted by the collimator lens 27 to reach the beam splitter 26 along the path of the incident light. In the return path, the light beam is transmitted by the beam splitter 26 and then transmitted by the plate beam splitter 30 and the detection lens 31 and then falls on the photodetector 32. The photodetector 32 performs photoelectric conversion of the incident light beam and outputs the obtained electric signal to an optical pickup control circuit (not shown in the figure). The optical pickup control circuit generates a focusing error signal, a tracking error signal, and an optical disk reproduction signal.

The red light beam emitted from the red and infrared semiconductor laser unit 22 is reflected by the plate beam splitter 30 and transmitted by the beam splitter 26 toward the collimator lens 27. The light beam that has been transmitted by the collimator lens 27 is bent by the mirror 28 and directed toward the objective lens 1 installed on the objective lens actuator 29. The red light beam converged by the objective lens 1 is collected on the information recording surface of the DVD 24 at an operation distance of about 0.44 mm.

The light reflected from the information recording surface of the DVD 24 is transmitted by the objective lens 1, reflected by the mirror 28, and transmitted by the collimator lens 27 and the beam splitter 26 to reach the plate beam splitter 30 along the path of the incident light. In the return path, the light beam is transmitted by the plate beam splitter 30 and then transmitted by the detection lens 31 and then falls on the photodetector 32. The photodetector 32 performs photoelectric conversion of the incident light beam and outputs the obtained electric signal to an optical pickup control circuit (not shown in the figure). The optical pickup control circuit generates a focusing error signal, a tracking error signal, and an optical disk reproduction signal.

The operation in the case of the infrared optical beam emitted from the red and infrared semiconductor laser unit 22 is similar to that in the above-described case of the red light beam, and the infrared light beam reaches the objective lens 1 by passing through the path same as described above. The infrared light beam converged by the objective lens 1 is focused on the information recording surface of the CD 25 at an operation distance of about 0.3 mm.

The reflected light from the information recording surface of the CD 25 falls on the photodetector 32 by passing through the same path as in the case of the red light beam. The photodetector 32 performs photoelectric conversion of the incident light beam and outputs the obtained electric signal to an optical pickup control circuit (not shown in the figure). The optical pickup control circuit generates a focusing error signal, a tracking error signal, and an optical disk reproduction signal.

The blue semiconductor laser unit 21, red and infrared semiconductor laser unit 22, beam splitter 26, mirror 28, plate beam splitter 30, detection lens 31, and photodetector 32 are installed as the above-described constituent components on the optical base 33. Further, the collimator lens 27 is installed on the CL actuator 44, and the CL actuator 44 is installed on the optical base 33. The objective lens actuator 29 is adhesively fixed to the optical base 33 after the positional adjustment of the objective lens 1 has been completed.

In FIG. 2, the x axis passes through the center of the objective lens 1 and is parallel to the tangential direction of the outer edge of a turntable 47a of a spindle motor 47. The y axis passes through the center of the objective lens 1 and is parallel to the radial direction of the turntable 47a of the spindle motor 47. Further, the rotation center of the spindle motor 47 is positioned on the y axis, and the turntable 47a is rotationally driven in a rotation direction Rm, which is a clockwise direction. The optical base 33 is supported by a main shaft 45 and an auxiliary shaft 46 disposed parallel to the y axis, and where the optical base 33 slides along the cylindrical surfaces of the main shaft 45 and the auxiliary shaft 46, the objective lens 1 moves along the y axis and can be moved to any radial position of the BD 23, DVD 24, or CD 25.

Therefore, in the top view, as shown in FIG. 2, the BD 23 (or DVD 24 or CD 25) rotates clockwise, and in an xy plane (xy system of coordinate) in which the center of the objective lens 1 is taken as an origin, the tracking direction, which is the radial direction of the BD 23, is taken as the y axis, and the tangential direction of tracks of the BD 23 is taken as an x axis, the center side of the BD 23 is taken as a positive direction for the y axis, a direction obtained by rotating the positive direction of the y axis clockwise through 90° is taken as a positive direction for the x axis, and four regions obtained by dividing the xy plane by the x axis and the y axis can be specified as a first quadrant, a second quadrant, a third quadrant, and a fourth quadrant in the counterclockwise direction.

The configuration of the CL actuator 44 is explained below with reference to FIG. 2.

Referring to FIG. 2, the collimator lens 27 is installed at the CL holder 41, and the CL holder 41 is supported by the CL actuator spindle 42 disposed parallel to the x axis. Where the CL holder 41 slides along the cylindrical surface of the CL actuator spindle 42, the collimator lens 27 moves along the x axis and can be moved to any position between the mirror 28 (see FIG. 1) and the beam splitter 26.

The rotating shaft of the stepping motor 43 is disposed substantially parallel to the x axis, and a lead screw is provided coaxially with the rotating shaft.

A protrusion engaging with a groove of the lead screw of the stepping motor 43 is provided at the end of the CL holder 41, and where the stepping motor 43 rotates, the lead screw also rotates. As a result, the CL holder 41 moves along the CL actuator spindle 42. Further, by adjusting the number of pulses in the drive signal inputted to the stepping motor 43, it is possible to determine the rotation amount of the lead screw and set the movement amount of the collimator lens 27.

The configuration of the objective lens actuator 29 will be explained below with reference to FIGS. 3, 4, 5, and 6.

Figure 3:
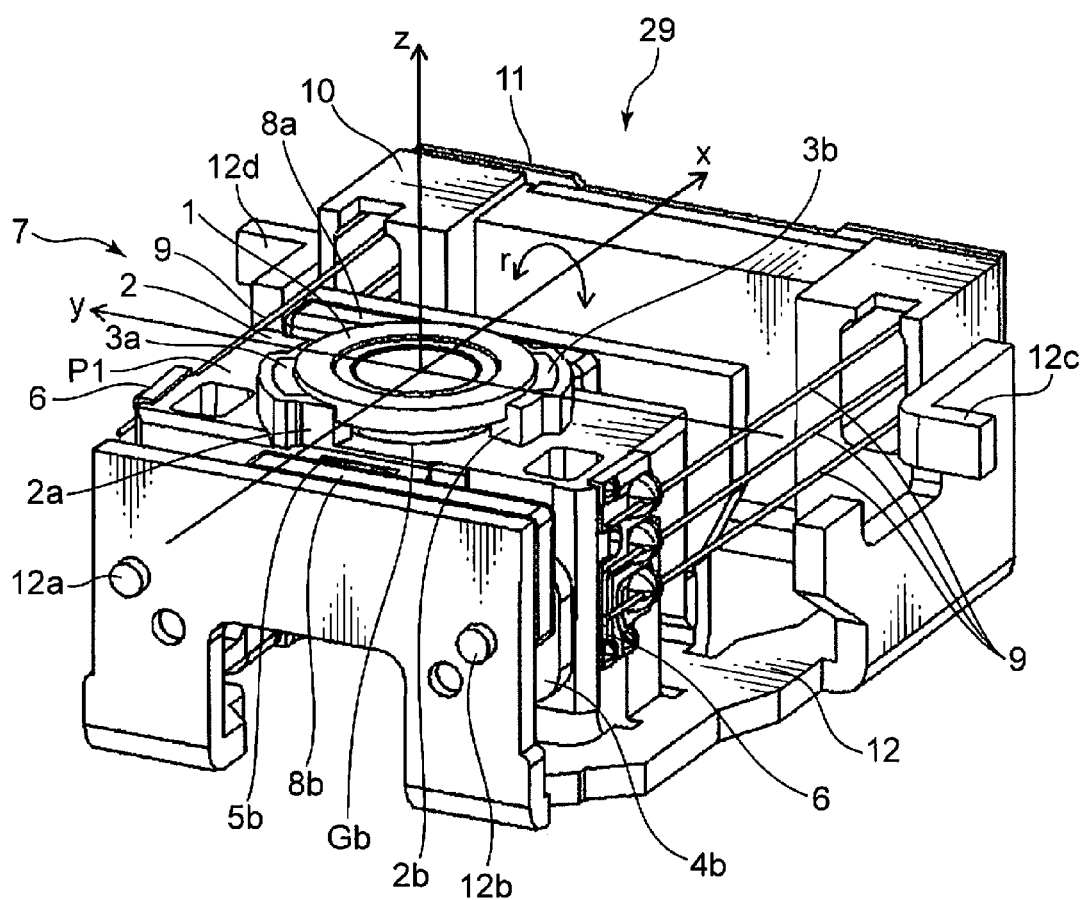
FIG. 3 is a perspective view illustrating the configuration of the objective lens actuator shown in FIG. 2.
Figure 4:
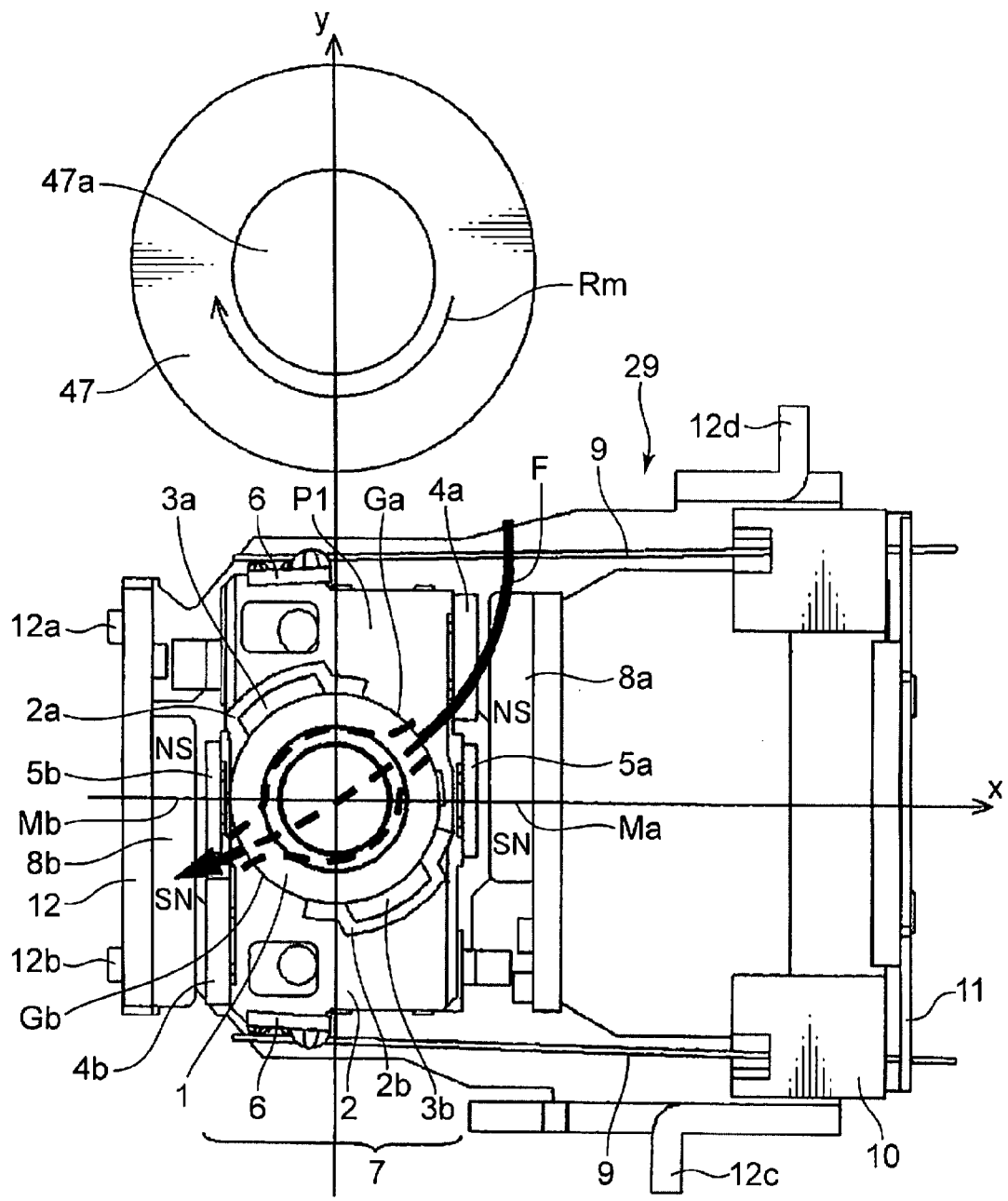
FIG. 4 is a top view illustrating the configuration of the objective lens actuator shown in FIG. 2.
Figure 5:
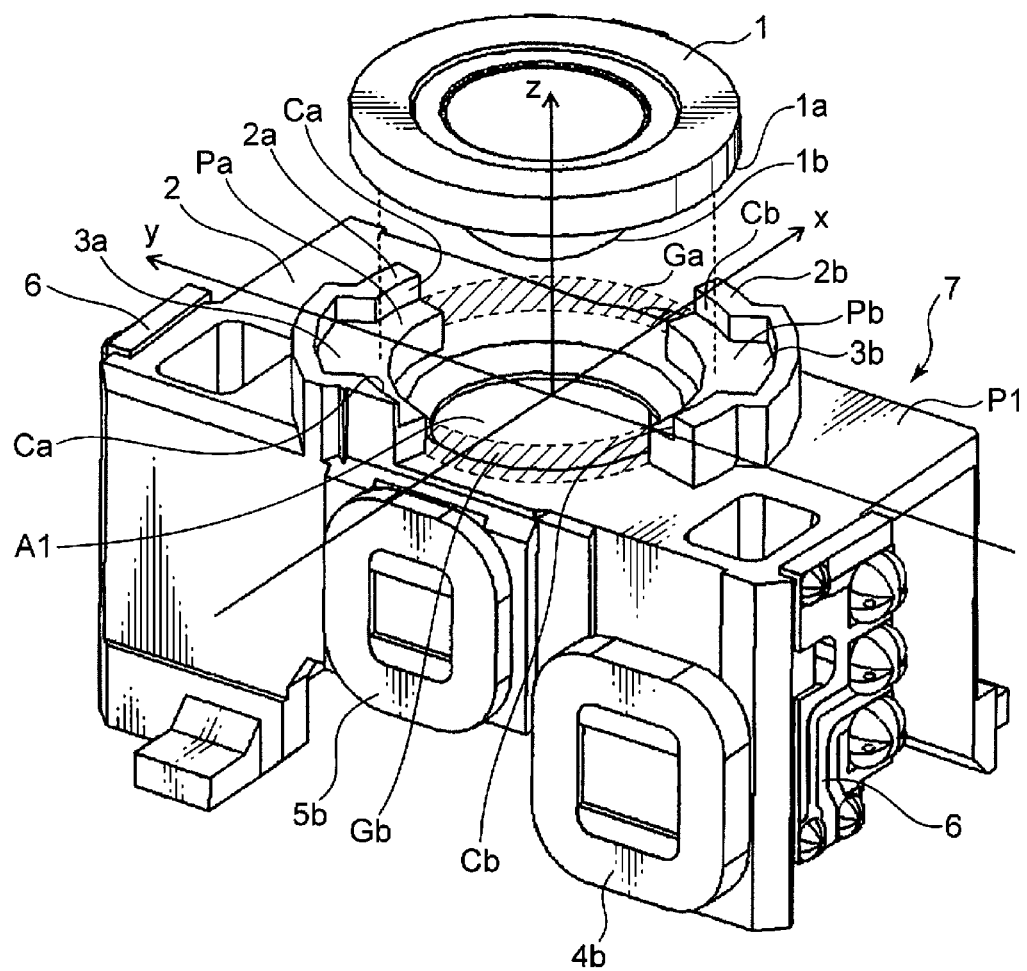
FIG. 5 is a perspective view illustrating the configuration of the movable body of the objective lens actuator shown in FIG. 2.
Figure 6:
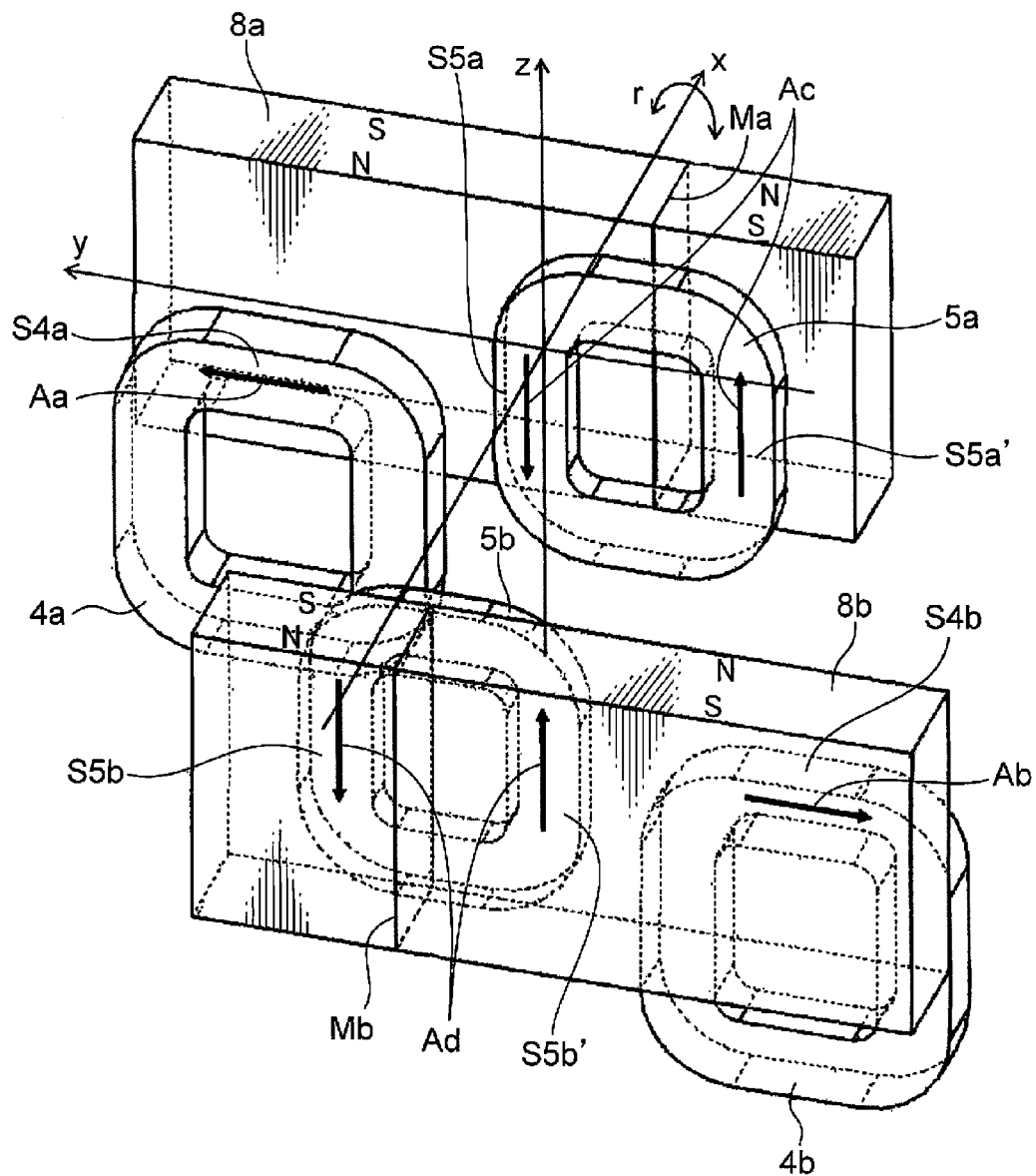
FIG. 6 is a perspective view illustrating the configuration of magnets and coils of the objective lens actuator shown in FIG. 2.

FIG. 3 is a perspective view illustrating the configuration of the objective lens actuator shown in FIG. 2. FIG. 4 is a top view illustrating the configuration of the objective lens actuator shown in FIG. 2. FIG. 5 is a perspective view illustrating the configuration of the movable body of the objective lens actuator shown in FIG. 2. FIG. 6 is a perspective view illustrating the configuration of magnets and coils of the objective lens actuator shown in FIG. 2.

The z axis shown in FIGS. 3, 5, and 6 is the central axis of the objective lens 1 which is perpendicular to the x axis and y axis; the three axes constitute a three-dimensional orthogonal system of coordinate. The r direction shown in FIGS. 3 and 6 is a radial tilt direction which is the rotation direction about the x axis.

The objective lens actuator 29 shown in FIGS. 3 and 4 includes a lens holder 2, two focusing coils 4a, 4b, two tracking coils 5a, 5b, two terminal plates 6, two magnets 8a, 8b, six suspension wires 9, a fixed member 10, a fixed substrate 11, and a yoke base 12. Further, the fixed member 10, fixed substrate 11, and yoke base 12 are examples of an actuator base holding one end of the suspension wires 9.

The lens holder 2 is constituted by a molded resin and has a substantially rectangular parallelepiped shape. The objective lens 1 is installed on the upper surface of the lens holder 2. The focusing coils 4a, 4b and the tracking coils 5a, 5b are mounted on two side surface of the lens holder 2 perpendicular to the x axis, and the terminal plates 6 are mounted on two respective side surfaces perpendicular to the y axis.

The detailed configuration of a movable body 7 will be explained below with reference to FIG. 5. The movable body 7 is constituted by the objective lens 1, lens holder 2, two focusing coils 4a, 4b, two tracking coils 5a, 5b, and two terminal plates 6.

The lens holder 2 has a round aperture A1 centered on the z axis, and a light beam falls from the aperture A1 on the objective lens 1. Therefore, the effective diameter of the light beam incident on the objective lens 1 is determined by the diameter of the aperture A1.

An objective lens installation section 2a and an objective lens installation section 2b are provided in a protruding condition so as to be centered on a region positioned in the second quadrant and a region positioned in the fourth quadrant, respectively, of the xy plane constituted by the x axis and y axis on a flat surface P1 on the upper side of the lens holder 2 in the top view thereof. The objective lens 1 is fixed to the objective lens installation section 2a, which is an example of the first fixed section, and to the objective lens installation section 2b, which is an example of the second fixed section. The objective lens installation section 2a is positioned at least in the second quadrant on the flat surface P1 of the lens holder 2, and the objective lens installation section 2b is positioned at least in the fourth quadrant.

In the present embodiment, a larger portion of the objective lens installation section 2a (for example, a portion taking 75% or more of the entire objective lens installation section 2a) is positioned in the second quadrant, and the remaining portion (for example, a portion taking less than 25% of the entire objective lens installation section 2a) is positioned in the first quadrant. A larger portion of the objective lens installation section 2b (for example, a portion taking 75% or more of the entire objective lens installation section 2b) is positioned in the fourth quadrant, and the remaining portion (for example, a portion taking less than 25% of the entire objective lens installation section 2b) is positioned in the third quadrant.

In the objective lens installation section 2a, an objective lens placement surface Pa is formed at a position above the flat surface P1 at a distance of about 0.4 mm therefrom. In the objective lens installation section 2b, an objective lens placement surface Pb is formed at a position above the flat surface P1 at a distance of about 0.4 mm therefrom. Four cylindrical surfaces Ca, Cb for which the z axis is the central axis rise at the edges of the objective lens placement surfaces Pa, Pb.

The objective lens 1 is positioned in the z axis direction by placing the underside edge 1a of the objective lens 1 on the objective lens placement surfaces Pa, Pb, and the objective lens 1 is positioned in the x axis direction and y axis direction by aligning the outer diameter of the objective lens 1 with the four cylindrical surfaces Ca, Cb. The number and positions of the cylindrical surfaces are not particularly limited to the above-described example and can be variously changed.

An adhesive application section 3a with a partially opened region is provided on the objective lens placement surface Pa, and an adhesive application section 3b with a partially opened region is provided on the objective lens placement surface Pb. In a state in which the objective lens 1 is positioned with respect to the lens holder 2, an adhesive is poured onto the adhesive application sections 3a, 3b and cured. As a result, the adhesive application sections 3a, 3b become bonding sections of the lens holder 2 and the objective lens 1, and the objective lens 1 is fixedly attached to the lens holder 2. The number and positions of the adhesive application sections are not particularly limited to the above-described example and can be variously changed.

As described hereinabove, as a result of fixing the objective lens 1 to the lens holder 2 between the objective lens installation section 2a and the objective lens installation section 2b, two gaps Ga, Gb (hatched regions surrounded by broken lines in FIG. 5) are formed between the underside edge 1a of the objective lens 1 and the flat surface P1 on the upper side of the lens holder 2. In this case, as shown in FIG. 4, in the top view, the gap Ga is formed to be centered on a region positioned in the first quadrant of the xy plane constituted by the x axis and y axis, and the gap Gb is formed to be centered on a region positioned in the third quadrant. Thus, the gap Ga is positioned at least in the first quadrant, and the gap Gb is positioned at least in the third quadrant.

The gap Ga on the first quadrant side and the gap Gb on the third quadrant side are connected by a space below the objective lens 1, and a ventilation path from the gap Ga on the first quadrant side to the gap Gb on the third quadrant side is formed below the objective lens 1. In this case, the flow of a spiral air current F generated in the vicinity of the optical disk surface is created along the direction shown by the arrow in FIG. 4 by the clockwise rotation (rotation in the rotation direction Rm) of any optical disk from among the BD 23, DVD 24, and CD 25. Therefore, the spiral air current F comes through so as to pass through the ventilation path from the gap Ga centered on the region in the first quadrant toward the gap Gb centered on the region in the third quadrant.

Further, the air current F introduced from the gap Ga on the first quadrant side diffuses to the circumferential edge section of the lens along a convex surface 1b on the lower side of the objective lens 1 inside the ventilation path (path shown by a broken line in FIG. 4) and then converges toward the gap Gb on the third quadrant side and is eventually discharged to the outside of the ventilation path.

The focusing coils 4a, 4b are flat coils wound in a rectangular shape. In this case, in the top view shown in FIG. 4, the focusing coil 4a is fixed by bonding to a region of the one side surface of the lens holder 2 that is perpendicular to the x axis, this region being positioned in the first quadrant of the xy plane constituted by the x axis and y axis, and the focusing coil 4b is fixed by bonding to a region of the other side surface of the lens holder 2 that is perpendicular to the x axis, this region being positioned in the third quadrant of the xy plane constituted by the x axis and y axis. Therefore, the focusing coil 4a is fixed to the side surface of the lens holder 2 inside the first quadrant, the focusing coil 4b is fixed to the side surface of the lens holder 2 inside the third quadrant, and the mutual arrangement of the focusing coil 4a and the focusing coil 4b is axially symmetric with respect to the z axis.

The tracking coils 5a, 5b are flat coils wound in a rectangular shape. In the top view, the tracking coil 5a is bonded to the center of the one side surface of the lens holder 2 that is perpendicular to the x axis, and the center of the bonding position of the tracking coil 5a is arranged to be positioned on the x axis. The tracking coil 5b is bonded to the center of the other side surface of the lens holder 2 that is perpendicular to the x axis, and the center of the bonding position of the tracking coil 5b is arranged to be positioned on the x axis.

Respective drive signals are independently supplied to the focusing coil 4a and the focusing coil 4b via the terminal plates 6, suspension wires 9, and fixed substrate 11.

The tracking coil 5a and the tracking coil 5b are connected in series, with the terminal plate 6 being interposed therebetween, and drive signals are supplied therein via the terminal plate 6, suspension wires 9, and fixed substrate 11.

The center of gravity of the movable body 7 configured as described hereinabove is positioned substantially on the z axis, in the top view thereof.

In FIGS. 3 and 4 the fixed member 10 and the fixed substrate 11 are each fixed to the yoke base 12. The suspension wires 9 represent an example of a support mechanism for supporting the lens holder 2 in a manner allowing the movement thereof in the focusing direction, which is the direction perpendicular to the information recording surface of the optical disk, and the tracking direction, which is the radial direction of the optical disk. In the present embodiment, the suspension wires 9 are constituted, for example, by six elastic metal wires, the proximal end sides thereof are fixed by soldering to the fixed substrate 11, and the distal end sides thereof are fixed by soldering to the terminal plate 6. As a result, the movable body 7 is supported by the suspension wires 9 so that the movable body can move in the z axis direction, which is the focusing direction (direction perpendicular to the information recording surface of the optical disk) with respect to the yoke base 12 to which the fixed substrate 11 is fixed, the x axis direction, which is the tracking direction (radial direction of the optical disk), and the radial tilt direction r.

Openings for passing the suspension wires 9 therethrough are provided in the fixed member 10. The resonance of the suspension wires 9 can be attenuated by injecting a fluid buffering agent into the openings and then curing the buffering agent into a gel.

In the objective lens actuator 29, the positions and tilt angles of the objective lens 1 in the x direction, y direction, and z direction with respect to the optical system configured on the optical base 33 are adjusted, and then fixed sections 12a, 12b, 12c, 12d of the yoke base 12 are bonded and fixed to the optical base 33.

In FIGS. 3, 4, and 6, two magnets 8a, 8b are magnetized in the mutually opposite directions that are parallel to the x axis in two regions for which a position substantially matching the x axis serves as a boundary line. The two magnets 8a, 8b are fixed to the yoke base 12 and arranged at positions that are axially symmetric with respect to the z axis.

More specifically, the magnet 8a, in the top view thereof, has a magnetizing boundary surface Ma on the x axis, applies magnetic fields in the opposite directions to two sides S5a, S5a' of the tracking coil 5a that are substantially parallel to the optical axis of the objective lens 1, and applies a magnetic field to an upper side S4a that is closer to the optical disk, from among the two sides of the focusing coil 4a that are substantially parallel to the y axis. The magnet 8b, in the top view thereof, has a magnetizing boundary surface Mb on the x axis, applies magnetic fields in the opposite directions to two sides S5b, S5b' of the tracking coil 5b that are substantially parallel to the optical axis of the objective lens 1, and applies a magnetic field to an upper side S4b that is closer to the optical disk, from among the two sides of the focusing coil 4b that are substantially parallel to the y axis.

With such a configuration, the focusing coils 4a, 4b can be attached below the lens holder 2 with respect to the objective lens 1, and therefore the focusing coils 4a, 4b, which are heat generation sources, can be separated from the objective lens 1, and the rise in temperature of the objective lens 1 can be inhibited.

The relationship between the magnets 8a, 8b, focusing coils 4a, 4b, and tracking coils 5a, 5b will be explained below in greater detail with reference to FIG. 6.

The sides S4a, S4b that are parallel to the y axis on the upper side of the focusing coils 4a, 4b are disposed at positions opposite the magnetic pole faces of the magnets 8a, 8b, respectively. Therefore, when independent drive signals are supplied to the focusing coils 4a, 4b and the electric currents of the same intensity flow in the directions shown by arrows Aa and Ab, respectively, drive forces of the same size in the positive direction (upper side in the figure) of the z axis are generated in the focusing coils 4a, 4b, and the objective lens 1 is driven in the positive direction of the z axis. Meanwhile, when the electric currents flow in the directions opposite those of the arrows Aa, Ab, the objective lens 1 is driven in the negative direction (upper side in the figure) of the z axis. Further, where the intensity of electric currents flowing in the focusing coils 4a, 4b is adjusted, a momentum force in the radial tilt direction r is generated and the objective lens 1 is tilted. Therefore, the drive in the tilt direction can be also performed.

The two sides S5a, S5a' of the tracking coils 5a and the two sides S5b, S5b' of the tracking coils 5b parallel to the z axis are disposed at positions opposite the respective different magnetic pole faces, with the magnetizing boundary surfaces Ma, Mb of the magnets 8a, 8b serving as boundaries. Therefore, when the tracking coils 5a, 5b are connected in series and electric currents in the directions of arrows Ac, Ad flow in the tracking coils 5a, 5b, a drive force in the positive direction (left side in the figure) of the y axis is generated in the tracking coils 5a, 5b, and the objective lens 1 is driven in the positive direction of the y axis. Meanwhile, when the electric currents flow in the directions opposite to the arrows Ac, Ad, the objective lens 1 is driven in the negative direction (right side in the figure) of the y axis.

With the above-described configuration, in the present embodiment, as a result of fixing the objective lens 1 to the lens holder 2, the two gaps Ga, Gb are configured between the underside edge 1a of the objective lens 1 and the flat surface P1 of the lens holder 2 in the regions substantially corresponding to the first quadrant and third quadrant in the xy plane constituted by the x axis and y axis on the flat surface P1 on the upper side of the lens holder 2. The gap Ga on the first quadrant side and the gap Gb on the third quadrant side are connected by the space below the objective lens 1, and the ventilation path from the gap Ga on the first quadrant side to the gap Gb on the third quadrant side is formed below the objective lens 1.

Where any optical disk from among the BD 23, DVD 24, and CD 25 is rotated clockwise, the flow of the spiral air current F generated in the vicinity of the optical disk surface is created along the arrow direction. Therefore, the spiral air current F comes through so as to pass through the ventilation path from the gap Ga configured in the region substantially in the first quadrant toward the gap Gb configured in the region substantially in the third quadrant, and heat can be efficiently dissipated from the surface on the lower side of the objective lens 1.

Further, the air current F introduced from the gap Ga on the first quadrant side diffuses to the circumferential edge section of the lens along the convex surface 1b on the lower side of the objective lens 1 inside the ventilation path and then converges toward the gap Gb on the third quadrant side and is discharged to the outside of the ventilation path. Therefore, the flow of the air current F is generated and is suitable for dissipating heat from the circumferential edge portion of the objective lens 1 where the rise in temperature is large, the entire amount of heat in the objective lens 1 can be dissipated with good efficiency, and this heat dissipation can level the temperature of the entire objective lens 1.

Therefore, even though the heat generated by the focusing coils 4a, 4b and the tracking coils 5a, 5b flows in via the adhesive of the adhesive application sections 3a, 3b, the rise in temperature of the objective lens 1 can be efficiently inhibited and leveled. As a result, even when the objective lens 1 is a resin objective lens compatible with DVD or CD, including BD, a good focusing characteristic can be obtained and an optical pickup device and an optical disk device making it possible to realize stable high-density recording and reproduction and cost reduction can be realized.

Further, the focusing coils 4a, 4b are disposed and bonded at the two end surfaces of the lens holder 2 perpendicular to the x axis in a mutual arrangement that is axially symmetrical with respect to the z axis in the regions substantially corresponding to the first quadrant and third quadrant of the xy plane constituted by the x axis and y axis. Therefore, by disposing the focusing coils 4a, 4b, in which the amount of generated heat easily becomes large, along the flow of the air current F, it is possible to cool directly the focusing coils 4a, 4b serving as heat generation sources. In addition, since the heat conduction path from the focusing coils 4a, 4b of the lens holder 2 to the objective lens 1 can be also cooled, the inflow of heat to the objective lens 1 can be inhibited with good efficiency.

Further, the tracking coils 5a, 5b are disposed and bonded at the two end surfaces of the lens holder 2 perpendicular to the x axis in the corresponding regions on the x axis in the xy plane constituted by the x axis and y axis. As a result, the set of the focusing coil 4a and the tracking coil 5a and the set of the focusing coil 4b and the tracking coil 5b are disposed close to each other. Therefore, by disposing the two sets along the flow of the air current F in a state with a centralized arrangement of heat generation sources, it is possible to cool directly the focusing coils 4a, 4b and the tracking coils 5a, 5b which are the heat generation sources. In addition, since the heat conduction path from the centralized heat generation sources of the lens holder 2 to the objective lens 1 can be also cooled, the inflow of heat to the objective lens 1 can be inhibited with good efficiency.

Further, since the set of the focusing coil 4a and the tracking coil 5a and the set of the focusing coil 4b and the tracking coil 5b are disposed close to each other, it is possible to arrange the drive sources close to each other and reduce the dimensions of the magnets 8a, 8b in the y axis directions. As a result, the volume of the magnets 8a, 8b can be reduced and the cost of the optical pickup device can be lowered.

By applying the configuration of the present embodiment to a thin optical pickup device with a dimension from the lower surface of the optical base 33 to the lower surface of the optical disk of equal to or less than 11 mm, it is possible to inhibit efficiently the inflow of heat to the objective lens 1, obtain a good focusing characteristic, and realize a thin pickup device capable of stable high-density recording and reproduction even when the lens holder 2 with a small thermal capacity is used.

Further, in the present embodiment, the objective lens 1, which is converging lens, is used as a three-wavelength compatible objective lens that is compatible with three wavelengths corresponding to the BD 23, DVD 24, and CD 25, but the same effect can be also demonstrated with a multiple-wavelength compatible lens that is compatible with two wavelengths corresponding to BD and DVD, or to BD and CD.

The same effect can be also demonstrated when the objective lens 1 is a resin lens focusing the light with a wavelength corresponding only to BD, rather than the three-wavelength compatible lens.

The same heat dissipation effect can be also obtained by using the configuration similar to that of the present embodiment when the objective lens 1 is a compatible objective lens corresponding to DVD and CD, an objective lens corresponding only to DVD or only to CD, or when those objective lenses are glass lenses. In this case, the allowed electric current that can be used to energize the focusing coils or tracking coils can be increased, the revolution speed of the optical disk can be further increase, and an optical pickup device and optical disk device corresponding to a high transfer rate can be realized. The features relating to the above-described objective lens are the same in the below-described other embodiments.

Embodiment 2

Figure 7:
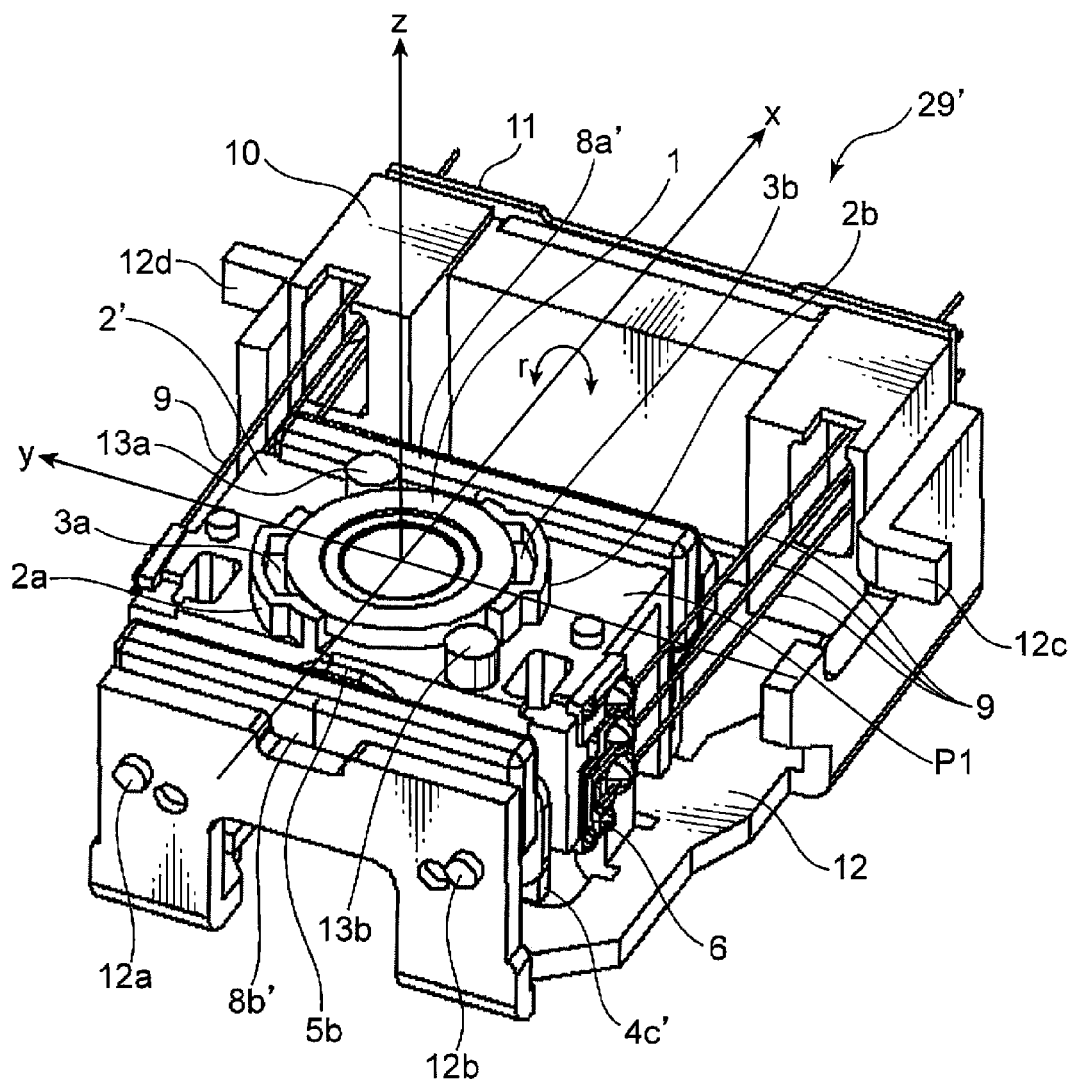
FIG. 7 is a perspective view illustrating the configuration of the objective lens actuator of the optical pickup device in Embodiment 2 of the present invention.
Figure 8:
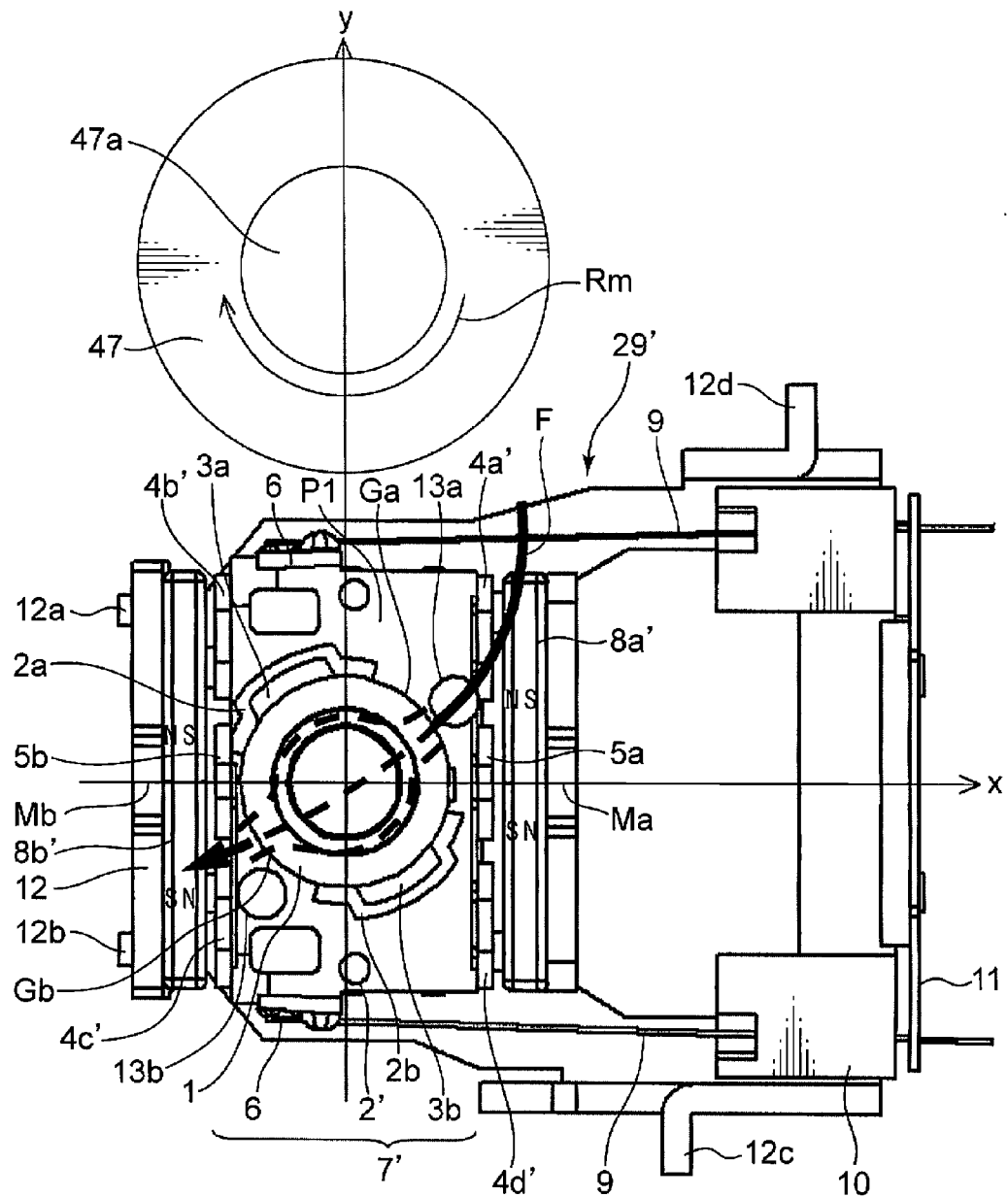
FIG. 8 is a top view illustrating the configuration of the objective lens actuator shown in FIG. 7.
Figure 9:
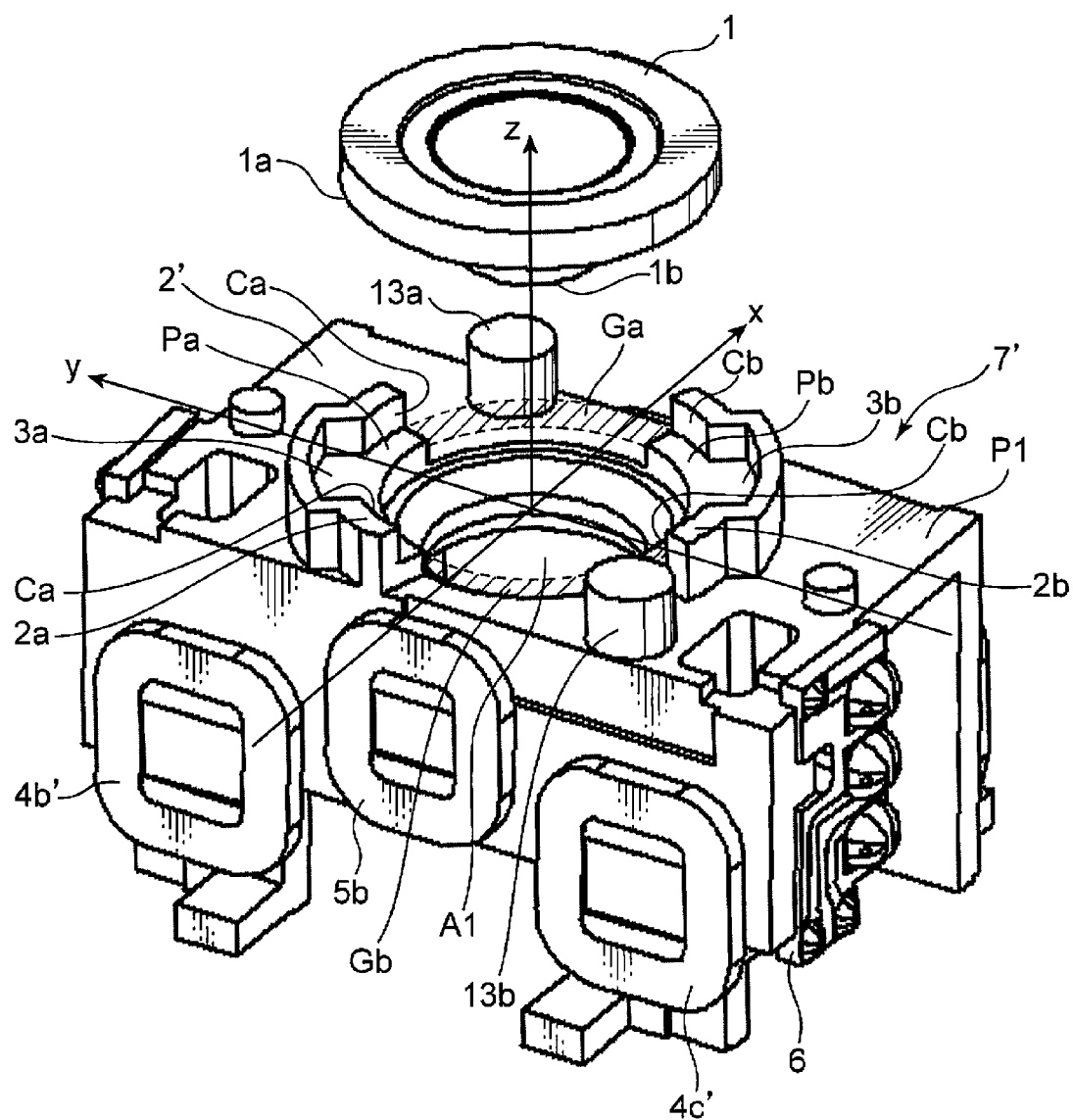
FIG. 9 is a perspective view illustrating the configuration of the movable body of the objective lens actuator shown in FIG. 7.
Figure 10:
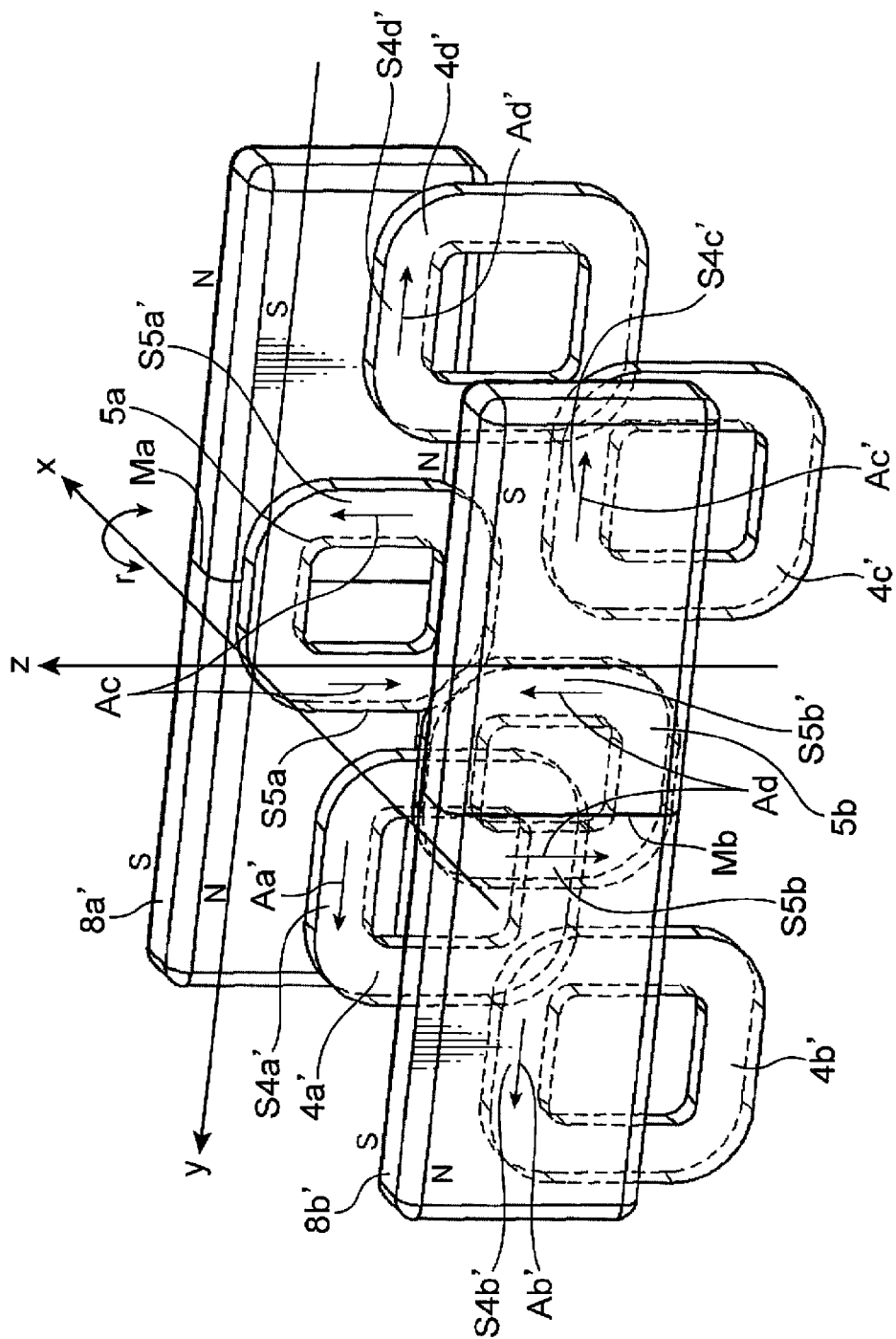
FIG. 10 is a perspective view illustrating the configuration of magnets and coils of the objective lens actuator shown in FIG. 7.

The optical pickup device of Embodiment 2 of the present invention is described below. FIG. 7 is a perspective view illustrating the configuration of the objective lens actuator of the optical pickup device in Embodiment 2 of the present invention. FIG. 8 is a top view illustrating the configuration of the objective lens actuator shown in FIG. 7. FIG. 9 is a perspective view illustrating the configuration of the movable body of the objective lens actuator shown in FIG. 7. FIG. 10 is a perspective view illustrating the configuration of magnets and coils of the objective lens actuator shown in FIG. 7.

The optical pickup device of the present embodiment is configured similarly to the optical pickup device shown in FIGS. 1 and 2, except that the objective lens actuator 29 shown in FIGS. 1 and 2 is replaced with the objective lens actuator 29' shown in FIG. 7. Therefore, graphic representation of the entire configuration is herein omitted and the explanation is performed with reference, as appropriate, also to FIGS. 1 and 2.

The optical pickup device of the present embodiment includes the objective lens 1, blue semiconductor laser unit 21, red and infrared semiconductor laser unit 22, beam splitter 26, collimator lens 27, mirror 28, objective lens actuator 29' shown in FIG. 7, plate beam splitter 30, detection lens 31, photodetector 32, and optical base 33 (see FIGS. 1 and 2). The optical pickup device is also provided with the CL actuator 44. The CL actuator 44 includes the CL holder 41, CL actuator spindle 42, and stepping motor 43 (see FIG. 2).

The above-described components are the same as those of the optical pickup device shown in FIGS. 1 and 2, with the exception of the objective lens actuator 29'. Therefore, detailed explanation thereof is herein omitted, and only the configuration of the objective lens 29', which is a principal specific component of the present embodiment, will be explained below in greater detail with reference to FIGS. 7 to 10.

The objective lens actuator 29' shown in FIGS. 7 and 8 is provided with a lens holder 2', four focusing coils 4a' to 4d', two tracking coils 5a, 5b, two terminal plates 6, two magnets 8a', 8b', six suspension wires 9, fixed member 10, fixed substrate 11, and yoke base 12. The objective lens actuator 29' is adhesively fixed to the optical base 33 (see FIGS. 1 and 2) after the positional adjustment of the objective lens 1 has been completed.

In FIGS. 7 to 10, the x axis passes through the center of the objective lens 1 and is parallel to the tangential direction of the outer edge of the turntable 47a of the spindle motor 47. The y axis passes through the center of the objective lens 1 and is parallel to the radial direction of the turntable 47a of the spindle motor 47. Further, the rotation center of the spindle motor 47 is positioned on the y axis, and the turntable 47a is rotationally driven in the rotation direction Rm, which is a clockwise direction.

Therefore, in the present embodiment, in the top view, as shown in FIG. 8, the BD 23 (or DVD 24 or CD 25) also rotates clockwise, and in the xy plane (xy system of coordinate) in which the center of the objective lens 1 is taken as an origin, the tracking direction, which is the radial direction of the BD 23, is taken as the y axis, and the tangential direction of tracks of the BD 23 is taken as an x axis, the center side of the BD 23 is taken as a positive direction for the y axis, a direction obtained by rotating the positive direction of the y axis clockwise through 90° is taken as a positive direction for the x axis, and four regions obtained by dividing the xy plane by the x axis and the y axis can be specified as a first quadrant, a second quadrant, a third quadrant, and a fourth quadrant in the counterclockwise direction.

The z axis shown in FIGS. 7, 9, and 10 is the central axis of the objective lens 1 which is perpendicular to the x axis and y axis; the three axes constitute a three-dimensional orthogonal system of coordinate. The r direction shown in FIGS. 7 and 10 is a radial tilt direction which is the rotation direction about the x axis.

The lens holder 2' is constituted by a molded resin and has a substantially rectangular parallelepiped shape. The objective lens 1 is installed on the upper surface of the lens holder 2'. The focusing coils 4a' to 4d' and the tracking coils 5a, 5b are mounted on two side surface of the lens holder 2' perpendicular to the x axis, and the terminal plates 6 are mounted on two respective side surfaces perpendicular to the y axis.

The detailed configuration of a movable body 7' will be explained below with reference to FIG. 9. The movable body 7' is constituted by the objective lens 1, lens holder 2', four focusing coils 4a' to 4d', two tracking coils 5a, 5b, and two terminal plates 6.

The lens holder 2' has a round aperture A1 centered on the z axis, and a light beam falls from the aperture A1 on the objective lens 1. Therefore, the effective diameter of the light beam incident on the objective lens 1 is determined by the diameter of the aperture A1.

The objective lens installation section 2a and the objective lens installation section 2b are provided in a protruding condition so as to be centered on a region positioned in the second quadrant and a region positioned in the fourth quadrant, respectively, of the xy plane constituted by the x axis and y axis on a flat surface P1 on the upper side of the lens holder 2' in the top view thereof. The objective lens 1 is fixed to the objective lens installation section 2a, which is an example of the first fixed section, and to the objective lens installation section 2b, which is an example of the second fixed section. The objective lens installation section 2a is positioned at least in the second quadrant on the flat surface P1 of the lens holder 2', and the objective lens installation section 2b is positioned at least in the fourth quadrant.

In the present embodiment, a larger portion of the objective lens installation section 2a (for example, a portion taking 75% or more of the entire objective lens installation section 2a) is positioned in the second quadrant, and the remaining portion (for example, a portion taking less than 25% of the entire objective lens installation section 2a) is positioned in the first quadrant. A larger portion of the objective lens installation section 2b (for example, a portion taking 75% or more of the entire objective lens installation section 2b) is positioned in the fourth quadrant, and the remaining portion (for example, a portion taking less than 25% of the entire objective lens installation section 2b) is positioned in the third quadrant.

In the objective lens installation section 2a, the objective lens placement surface Pa is formed at a position above the flat surface P1 at a distance of about 0.4 mm therefrom. In the objective lens installation section 2b, an objective lens placement surface Pb is formed at a position above the flat surface P1 at a distance of about 0.4 mm therefrom. Four cylindrical surfaces Ca, Cb for which the z axis is the central axis rise at the edges of the objective lens placement surfaces Pa, Pb.

The objective lens 1 is positioned in the z axis direction by placing the underside edge 1a of the objective lens 1 on the objective lens placement surfaces Pa, Pb, and the objective lens 1 is positioned in the x axis direction and y axis direction by aligning the outer diameter of the objective lens 1 with the four cylindrical surfaces Ca, Cb. The number and positions of the cylindrical surfaces are not particularly limited to the above-described example and can be variously changed.

The adhesive application section 3a with a partially opened region is provided on the objective lens placement surface Pa, and the adhesive application section 3b with a partially opened region is provided on the objective lens placement surface Pb. In a state in which the objective lens 1 is positioned with respect to the lens holder 2', an adhesive is poured onto the adhesive application sections 3a, 3b and cured, thereby fixedly attaching the objective lens 1 to the lens holder 2'. The number and positions of the adhesive application sections are not particularly limited to the above-described example and can be variously changed.

As described hereinabove, as a result of fixing the objective lens 1 to the lens holder 2', the two gaps Ga, Gb (hatched regions surrounded by broken lines in FIG. 9) are formed between the underside edge 1a of the objective lens 1 and the flat surface P1 on the upper side of the lens holder 2'. In this case, as shown in FIG. 8, in the top view, the gap Ga is formed to be centered on a region positioned in the first quadrant of the xy plane constituted by the x axis and y axis, and the gap Gb is formed to be centered on a region positioned in the third quadrant. Thus, the gap Ga is positioned at least in the first quadrant, and the gap Gb is positioned at least in the third quadrant.

Further, within the flat surface P1 on the upper side of the lens holder 2', in the top view thereof, a lens protector 13a is provided in a protruding condition in the region positioned in the first quadrant and a lens protector 13b is provided in a protruding condition in the region positioned in the third quadrant of the xy plane constituted by the x axis and y axis. The lens protectors 13a, 13b are convex sections having a round columnar shape and prevent the objective lens 1 from coming into contact with the optical disk. The height of the lens protectors 13a, 13b is set such that when the end section of the upper surface thereof is in contact with the optical disk, the objective lens 1 is not in contact with the optical disk. The shape of the lens protectors is not particularly limited to that of the above described examples and any other shape may be used, provided that the objective lens 1 can be prevented from coming into contact with the optical disk.

In the lens holder 2', the objective lens placement sections 2a, 2b are disposed in the regions positioned in the second quadrant and fourth quadrant. Therefore, the objective lens placement sections 2a, 2b are unbalanced with respect to the inertia momentum of the movable body 7'. However, in the present embodiment, the inertia momentum of the movable body 7' is balanced by disposing the lens protectors 13a, 13b in the regions positioned in the first quadrant and third quadrant. As a result, even though the objective lens placement sections 2a, 2b are disposed in the unbalanced positions as a measure against the heat, the inertia momentum of the movable body 7' can be balanced by the lens protectors 13a, 13b and therefore the unnecessary rolling of the movable body 7' can be prevented.

The gap Ga on the first quadrant side and the gap Gb on the third quadrant side are connected by a space below the objective lens 1, and a ventilation path from the gap Ga on the first quadrant side to the gap Gb on the third quadrant side is formed below the objective lens 1. In this case, as shown in FIG. 8, the flow of the spiral air current F generated in the vicinity of the optical disk surface is created along the direction shown by the arrow by the clockwise rotation (rotation in the rotation direction Rm) of any optical disk from among the BD 23, DVD 24, and CD 25.

In this case, since the lens protector 13a is positioned on the upstream side of the air current F, but the width of the lens protector 13a is sufficiently less than the width of the gap Ga, the spiral air current F comes through so as to pass through the ventilation path from the gap Ga configured to be centered on the region in the first quadrant toward the gap Gb configured to be centered on the region in the third quadrant.

Further, the air current F introduced from the gap Ga on the first quadrant side diffuses to the circumferential edge section of the lens along the convex surface 1b on the lower side of the objective lens 1 inside the ventilation path (path shown by a broken line in FIG. 8) and then converges toward the gap Gb on the third quadrant side and is eventually discharged to the outside of the ventilation path.

The focusing coils 4a' to 4d' are flat coils wound in a rectangular shape. In this case, in the top view shown in FIG. 8, the focusing coil 4a' is fixed by bonding to a region of the one side surface of the lens holder 2' that is perpendicular to the x axis, this region being positioned in the first quadrant of the xy plane constituted by the x axis and y axis, the focusing coil 4b' is fixed by bonding to a region of the other side surface of the lens holder 2' that is perpendicular to the x axis, this region being positioned in the second quadrant, the focusing coil 4c' is fixed by bonding to a region of the other side surface of the lens holder 2' that is perpendicular to the x axis, this region being positioned in the third quadrant, and the focusing coil 4d' is fixed by bonding to a region of the one side surface of the lens holder 2' that is perpendicular to the x axis, this region being positioned in the fourth quadrant.

Therefore, the mutual arrangement of the focusing coil 4a' and the focusing coil 4c' is axially symmetric with respect to the z axis, the mutual arrangement of the focusing coil 4b' and the focusing coil 4d' is axially symmetric with respect to the z axis, and the focusing coils 4a' to 4d' are disposed in a balanced manner such that the origin point in the center of the objective lens 1 is the center of gravity.

The tracking coils 5a, 5b are flat coils wound in a rectangular shape. In the top view, the tracking coil 5a is bonded to the center of the one side surface of the lens holder 2' that is perpendicular to the x axis, and the center of the bonding position of the tracking coil 5a is arranged to be positioned on the x axis. The tracking coil 5b is bonded to the center of the other side surface of the lens holder 2' that is perpendicular to the x axis, and the center of the bonding position of the tracking coil 5b is arranged to be positioned on the x axis.

Respective drive signals are independently supplied to the focusing coils 4a', 4b' and the focusing coils 4c', 4d' via the terminal plates 6, suspension wires 9, and fixed substrate 11.

The tracking coil 5a and the tracking coil 5b are connected in series, with the terminal plate 6 being interposed therebetween, and drive signals are supplied therein via the terminal plates 6, suspension wires 9, and fixed substrate 11.

The center of gravity of the movable body T configured as described hereinabove is positioned substantially on the z axis, in the top view thereof.

In FIGS. 7 and 8 the fixed member 10 and the fixed substrate 11 are each fixed to the yoke base 12. The suspension wires 9 represent an example of a support mechanism for supporting the lens holder 2' in a manner allowing the movement thereof in the focusing direction, which is the direction perpendicular to the information recording surface of the optical disk, and the tracking direction, which is the radial direction of the optical disk. In the present embodiment, the suspension wires 9 are constituted, for example, by six elastic metal wires, the proximal end sides thereof are fixed by soldering to the fixed substrate 11, and the distal end sides thereof are fixed by soldering to the terminal plate 6. As a result, the movable body 7' is supported by the suspension wires 9 so that the movable body can move in the z axis direction, which is the focusing direction (direction perpendicular to the information recording surface of the optical disk) with respect to the yoke base 12 to which the fixed substrate 11 is fixed, the x axis direction, which is the tracking direction (radial direction of the optical disk), and the radial tilt direction r.

Openings for passing the suspension wires 9 therethrough are provided in the fixed member 10. The resonance of the suspension wires 9 can be attenuated by injecting a fluid buffering agent into the openings and then curing the buffering agent into a gel.

In the objective lens actuator 29', the positions and tilt angles of the objective lens 1 in the x direction, y direction, and z direction with respect to the optical system configured on the optical base 33 are adjusted, and then the fixed sections 12a, 12b, 12c, 12d of the yoke base 12 are bonded and fixed to the optical base 33.

In FIGS. 7, 8, and 10, two magnets 8a', 8b' are magnetized in the mutually opposite directions that are parallel to the x axis in two regions for which a position substantially matching the x axis serves as a boundary line. The two magnets 8a', 8b' are fixed to the yoke base 12 and arranged at positions that are line-symmetric with respect to the y axis.

More specifically, the magnet 8a', in the top view thereof, has a magnetizing boundary surface Ma on the x axis, applies magnetic fields in the opposite directions to two sides S5a, S5a' of the tracking coil 5a that are substantially parallel to the optical axis of the objective lens 1, applies a magnetic field to an upper side S4a' that is closer to the optical disk, from among the two sides of the focusing coil 4a' that are substantially parallel to the y axis, and also applies a magnetic field to an upper side S4d' that is closer to the optical disk, from among the two sides of the focusing coil 4d' that are substantially parallel to the y axis. The magnet 8b', in the top view thereof, has a magnetizing boundary surface Mb on the x axis, applies magnetic fields in the opposite directions to two sides S5b, S5b' of the tracking coil 5b that are substantially parallel to the optical axis of the objective lens 1, applies a magnetic field to an upper side S4b' that is closer to the optical disk, from among the two sides of the focusing coil 4b' that are substantially parallel to the y axis, and also applies a magnetic field to an upper side S4c' that is closer to the optical disk, from among the two sides of the focusing coil 4c' that are substantially parallel to the y axis.

With such a configuration, the focusing coils 4a' to 4d' can be attached below the lens holder 2' with respect to the objective lens 1, and therefore the focusing coils 4a' to 4d', which are heat generation sources, can be separated from the objective lens 1, and the rise in temperature of the objective lens 1 can be inhibited.

The relationship between the magnets 8a', 8b', focusing coils 4a' to 4d', and tracking coils 5a, 5b will be explained below in greater detail with reference to FIG. 10.

The relationship between the magnets 8a, 8b, focusing coils 4a' to 4d', and tracking coils 5a, 5b will be explained below in greater detail with reference to FIG. 10.

The sides S4a' to S4d' that are parallel to the y axis on the upper side of the focusing coils 4a' to 4d' are disposed at positions opposite the magnetic pole faces of the magnets 8a', 8b', respectively. Therefore, when independent drive signals are supplied to the focusing coils 4a', 4b' and the focusing coils 4c', 4d' and the electric currents of the same intensity flow in the directions shown by arrows Aa' to Ad', respectively, drive forces of the same size in the positive direction (upper side in the figure) of the z axis are generated in the focusing coils 4a' to 4d', and the objective lens 1 is driven in the positive direction of the z axis. Meanwhile, when the electric currents flow in the directions opposite those of the arrows Aa' to Ad', the objective lens 1 is driven in the negative direction (upper side in the figure) of the z axis. Further, where the intensity of electric currents flowing in the focusing coils 4a', 4b' and the focusing coils 4c', 4d' is adjusted, a momentum force in the radial tilt direction r is generated and the objective lens 1 is tilted. Therefore, the drive in the tilt direction can be also performed.

The two sides S5a, S5a', S5b, S5b' of the tracking coils 5a, 5b parallel to the z axis are disposed at positions opposite the respective different magnetic pole faces, with the magnetizing boundary surfaces Ma, Mb of the magnets 8a', 8b' serving as boundaries. Therefore, when the tracking coils 5a, 5b are connected in series and electric currents in the directions of arrows Ac, Ad flow in the tracking coils 5a, 5b, a drive force in the positive direction (left side in the figure) of the y axis is generated in the tracking coils 5a, 5b, and the objective lens 1 is driven in the positive direction of the y axis. Meanwhile, when the electric currents flow in the directions opposite to the arrows Ac, Ad, the objective lens 1 is driven in the negative direction (right side in the figure) of the y axis.

Figure 11:
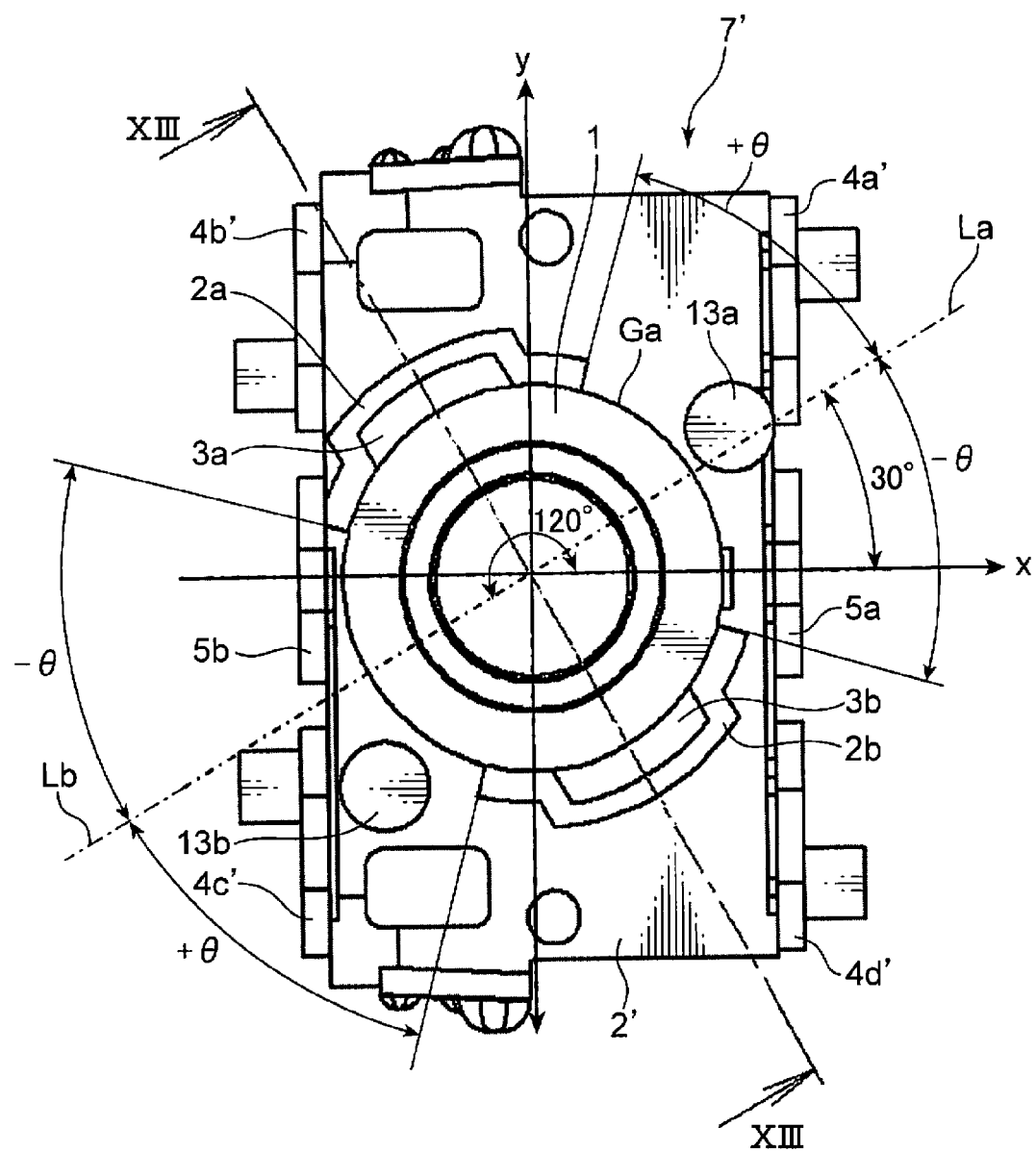
FIG. 11 is a top view for explaining the positions and sizes of the gaps provided in the movable body of the objective lens actuator shown in FIG. 7.
Figure 12:
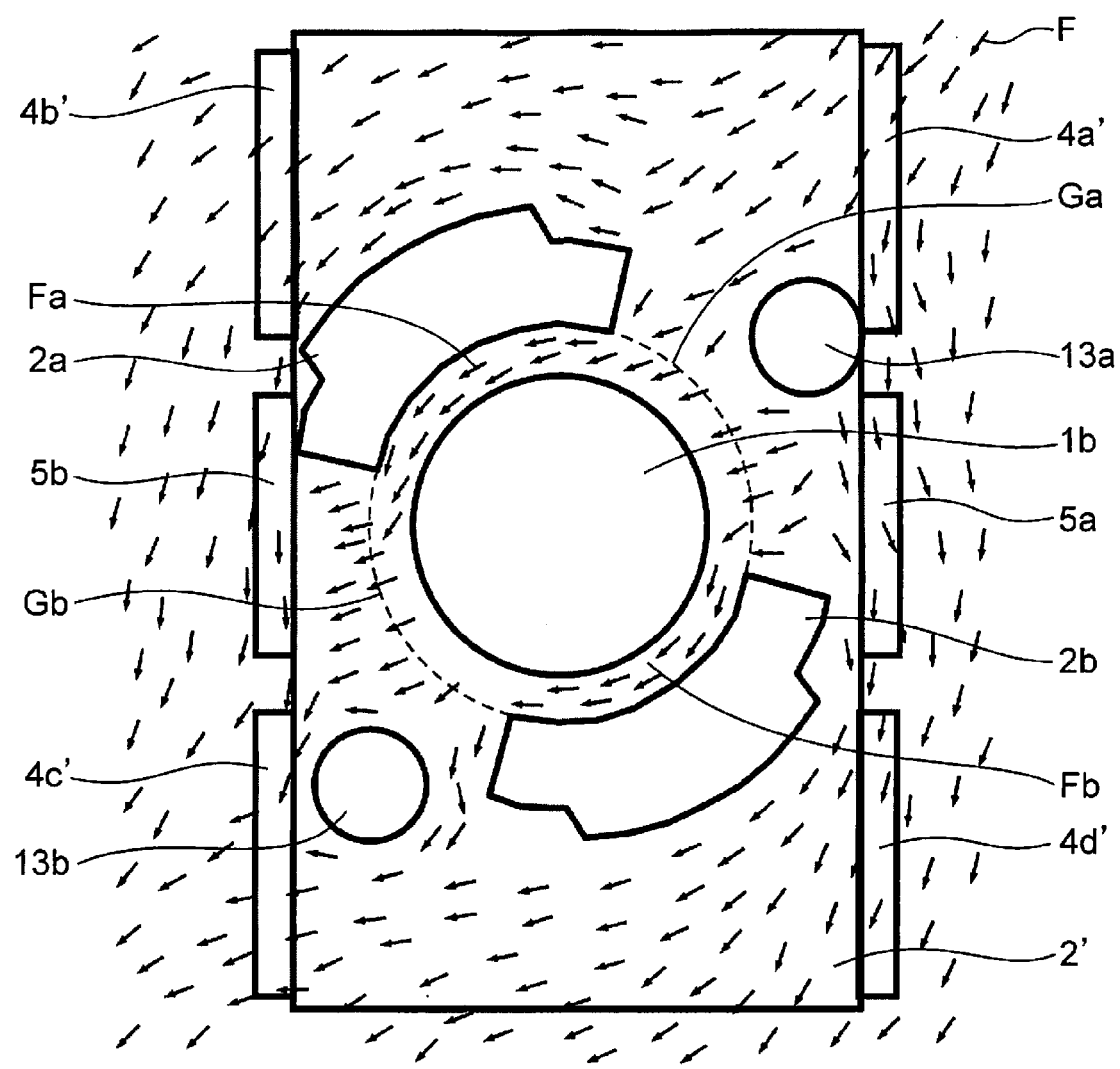
FIG. 12 is a schematic diagram illustrating the results obtained in simulation of a gas flow in the movable body shown in FIG. 11.
Figure 13:
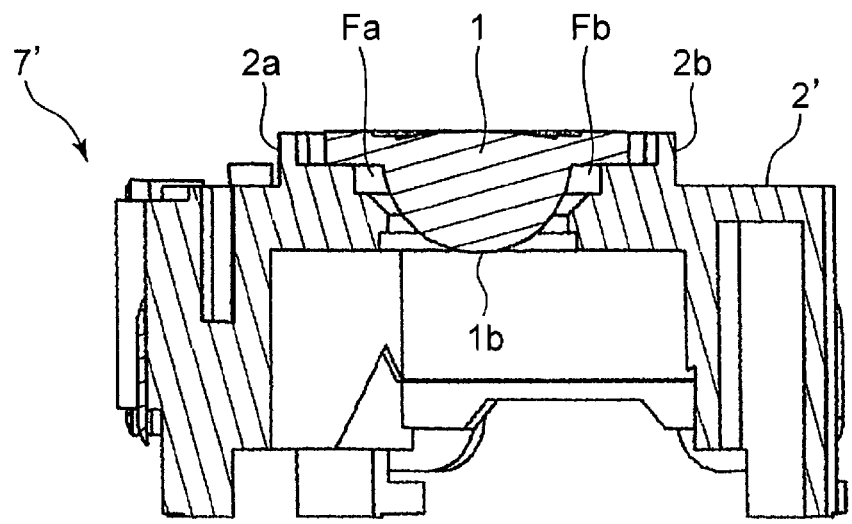
FIG. 13 is a cross-sectional view of the movable body taken along the XIII-XIII line in FIG. 11.

The results obtained in examining the positions and sizes of the gaps Ga, Gb will be described below. FIG. 11 is a top view for explaining the positions and sizes of the gaps provided in the movable body of the objective lens actuator shown in FIG. 7. FIG. 12 is a schematic diagram illustrating the results obtained in simulation of a gas flow in the movable body shown in FIG. 11. FIG. 13 is a cross-sectional view of the movable body taken along the XIII-XIII line in FIG. 11.

As shown in FIG. 11, the center of the gap Ga formed between the objective lens 1 and the lens holder 2' in the top view is preferably positioned on a straight line La obtained by rotating the positive-direction portion of the x axis in the counterclockwise through 30°, and the center of the gap Gb is preferably positioned on a straight line Lb obtained by rotating the positive-direction portion of the x axis counterclockwise through 210°. The flow direction of the air current F with respect to the lens holder 2' somewhat changes depending on the revolution speed of the optical disk and the position of the objective lens 1 in the radial direction of the optical disk, but where the centers of the gaps Ga, Gb are disposed in the above-described positions, the inflow of the air current F is centered on the straight line obtained by rotating the positive-direction portion of the x axis counterclockwise through 30° and the air flows from the first quadrant into the third quadrant. Therefore, the air flows smoothly from the gap Ga into the gap Gb and the objective lens 1 can be cooled efficiently.

In the top view, the width ±θ° of the gap Ga is preferably ±30° to ±60°, more preferably ±40° to ±50°. The width ±θ° of the gap Gb is preferably ±30° to ±60°, more preferably ±40° to ±50°. Within a range less than ±30°, the objective lens 1 cannot be sufficiently cooled, and within a range greater than ±60°, the objective lens 1 is difficult to fix accurately to the lens holder 2'. Meanwhile within a range of ±30° to ±60°, the objective lens 1 can be sufficiently cooled, and the objective lens 1 can be accurately fixed to the lens holder 2'.

For example, in the present embodiment, the width ±θ° of the gaps Ga, Ga is set to ±45°. The results obtained in simulating the air current F in this case are shown in FIG. 12. In FIG. 12, the air current F is shown by a plurality of arrows. The air current F is along the upper surface of the lens holder 2' and follows the direction of arrows.

More specifically, the air current F flows in from the upper right side of the lens holder 2', flows between the objective lens placement section 2a and the lens protector 13a and between the lens protector 13a and the objective lens placement section 2b, and flows into the gap Ga shown by a broken line. Then, the air current F flows in the flow channel Fa (see FIG. 13) between the objective lens placement section 2a and the convex surface 1b on the lower side of the objective lens 1 and in the flow channel Fb (see FIG. 13) between the convex surface 1b on the lower side of the objective lens 1 and the objective lens placement section 2b and the flows merge in the gap Gb shown by the broken line. The air current F then flows between the objective lens placement section 2a and the lens protector 13b and between the lens protector 13b and the objective lens placement section 2b and is eventually discharged to the outside of the lens holder 2'. The objective lens 1 thus can be efficiently cooled by the air current F.

Further, the air current F also flows along the sides of the focusing coil 4a', tracking coil 5a, and focusing coil 4d' that are fixed to one side surface of the lens holder 2' and flows along the sides of the focusing coil 4b', tracking coil 5b, and focusing coil 4c' fixed to the other side surface of the lens holder 2'. The focusing coils 4a' to 4d' and the tracking coils 5a, 5b, which serve as heat generation sources, can be efficiently cooled by such a flow of the air current F.

With the above-described configuration, in the present embodiment, as a result of fixing the objective lens 1 to the lens holder 2', the two gaps Ga, Gb are also configured between the underside edge 1a of the objective lens 1 and the flat surface P1 of the lens holder 2' in the regions substantially corresponding to the first quadrant and third quadrant in the xy plane constituted by the x axis and y axis on the flat surface P1 on the upper side of the lens holder 2'. The gap Ga on the first quadrant side and the gap Gb on the third quadrant side are connected by the space below the objective lens 1, and the ventilation path from the gap Ga on the first quadrant side to the gap Gb on the third quadrant side is formed below the objective lens 1.

Where any optical disk from among the BD 23, DVD 24, and CD 25 is rotated clockwise, the flow of the spiral air current F generated in the vicinity of the optical disk surface is created along the arrow direction. Therefore, the spiral air current F comes through so as to pass through the ventilation path from the gap Ga configured in the region substantially in the first quadrant toward the gap Gb configured in the region substantially in the third quadrant, and heat can be efficiently dissipated from the surface on the lower side of the objective lens 1.

Further, the air current F introduced from the gap Ga on the first quadrant side diffuses to the circumferential edge section of the lens along the convex surface 1b on the lower side of the objective lens 1 inside the ventilation path and then converges toward the gap Gb on the third quadrant side and is discharged to the outside of the ventilation path. Therefore, the flow of the air current F is generated and is suitable for dissipating heat from the circumferential edge portion of the objective lens 1 where the rise in temperature is large, the entire amount of heat in the objective lens 1 can be dissipated with good efficiency, and this heat dissipation can level the temperature of the entire objective lens 1.

Therefore, even though the heat generated by the focusing coils 4a' to 4d' and the tracking coils 5a, 5b flows in via the adhesive of the adhesive application sections 3a, 3b, the rise in temperature of the objective lens 1 can be efficiently inhibited and leveled. As a result, even when the objective lens 1 is a resin objective lens compatible with DVD or CD, including BD, a good focusing characteristic can be obtained and an optical pickup device and an optical disk device making it possible to realize stable high-density recording and reproduction and cost reduction can be realized.

Further, the focusing coils 4a' to 4d' are disposed and bonded at the two end surfaces of the lens holder 2' perpendicular to the x axis in a mutual arrangement that is line-symmetric with respect to the y axis in the regions substantially corresponding to the first quadrant to fourth quadrant of the xy plane constituted by the x axis and y axis. Therefore, by disposing the focusing coils 4a', 4c', from among the focusing coils 4a' to 4d' in which the amount of generated heat easily becomes large, along the flow of the air current F, it is possible to cool directly the two focusing coils 4a', 4c' serving as heat generation sources. In addition, since the heat conduction path from the focusing coils 4a', 4c' of the lens holder 2' to the objective lens 1 can be also cooled, the inflow of heat to the objective lens 1 can be inhibited with good efficiency.

Further, the tracking coils 5a, 5b are disposed and bonded at the two end surfaces of the lens holder 2' perpendicular to the x axis in the corresponding regions on the x axis in the xy plane constituted by the x axis and y axis. As a result, the set of the focusing coil 4a', 4d' and the tracking coil 5a and the set of the focusing coils 4b', 4c' and the tracking coil 5b are disposed close to each other. Therefore, by disposing the two sets along the flow of the air current F in a state with a centralized arrangement of heat generation sources, it is possible to cool directly the tracking coils 5a, 5b and the focusing coils 4a' to 4d' which are the heat generation sources. In addition, since the heat conduction path from the centralized heat generation sources of the lens holder 2' to the objective lens 1 can be also cooled, the inflow of heat to the objective lens 1 can be inhibited with good efficiency.

By applying the configuration of the present embodiment to a thin optical pickup device with a dimension from the lower surface of the optical base 33 to the lower surface of the optical disk of equal to or less than 11 mm, it is possible to inhibit efficiently the inflow of heat to the objective lens 1, obtain a good focusing characteristic, and realize a thin pickup device capable of stable high-density recording and reproduction even when the lens holder 2' with a small thermal capacity is used.

Embodiment 3

Figure 14:
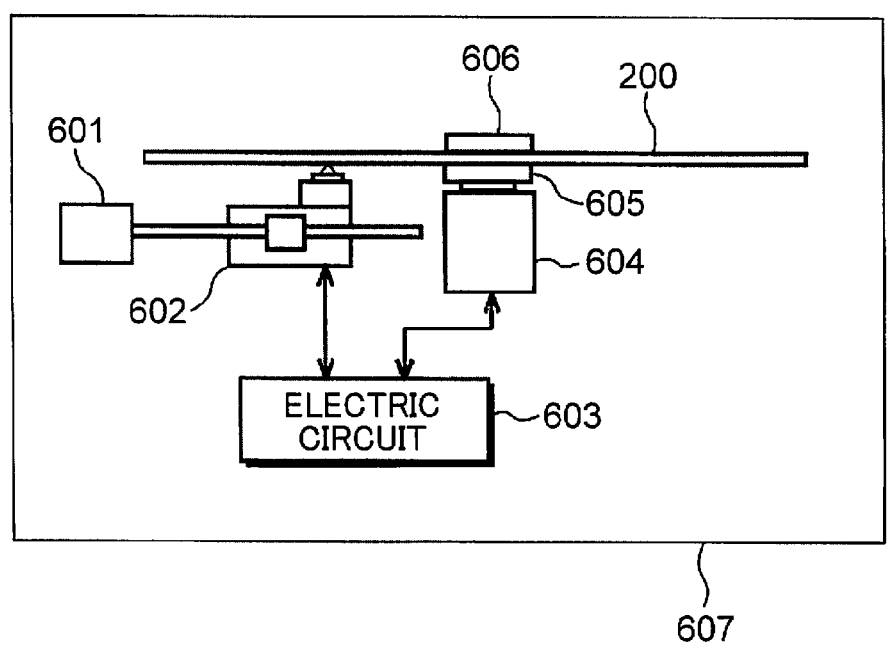
FIG. 14 is a schematic diagram illustrating the schematic configuration of the optical disk device in Embodiment 3 of the present invention.

FIG. 14 illustrates an embodiment of an optical disk device which is an example of an optical information device using the optical pickup device of the above-described Embodiment 1 or Embodiment 2. FIG. 14 is a schematic diagram illustrating the schematic configuration of the optical disk device in Embodiment 3 of the present invention. Referring to FIG. 14, an optical disk device 607 is provided with a drive device 601, an optical pickup device 602, an electric circuit 603, a motor 604, a turntable 605, and a clamper 606.

Referring to FIG. 14, the optical disk 200 is placed on the turntable 605, held by the damper 606, and rotated by the motor 604. The optical pickup device 602 shown in Embodiment 1 or 2 is transferred by the drive device 601 to a position on the optical disk 200 where the desired information is present.

The electric circuit 603 is an example of a control unit that controls the optical pickup device 602 and the motor 604 on the basis of the signal obtained from the optical pickup device 602. The optical pickup device 602 sends a focusing signal, a tracking signal, and a RF signal to the electric circuit 603 correspondingly to the mutual arrangement with the optical disk 200. In response to those signals, the electric circuit 603 sends a signal for driving the objective lens actuator to the optical pickup device 602. In response to this signal, the optical pickup device 602 performs focusing control, tracking control, and tilt control with respect to the optical disk 200 and reads, writes, or deletes information.

In the explanation above, the optical disk 200 is the BD 23, or DVD 24, or CD 25 mentioned in Embodiment 1 or 2, and the optical pickup device 602 uses a three-wavelength compatible lens explained in Embodiment 1 or 2 in which light beams of three wavelengths are focused by a single objective lens 1 and recording and reproduction of information is performed with respect to the optical disk corresponding to each wavelength.

In the optical disk device 607 of the present embodiment, even when the heat generated by the focusing coils 4a, 4b or 4a' to 4d' and the tracking coils 5a, 5b flows in from the adhesive application sections 3a, 3b, the rise in temperature of the objective lens 1 can be efficiently inhibited and leveled. As a result, an optical disk device that makes it possible to obtain a good focusing characteristic, realize stable high-density recording and reproduction, and reduce cost can be realized even when the objective lens 1 is a resin objective lens.

Embodiment 4

Figure 15:
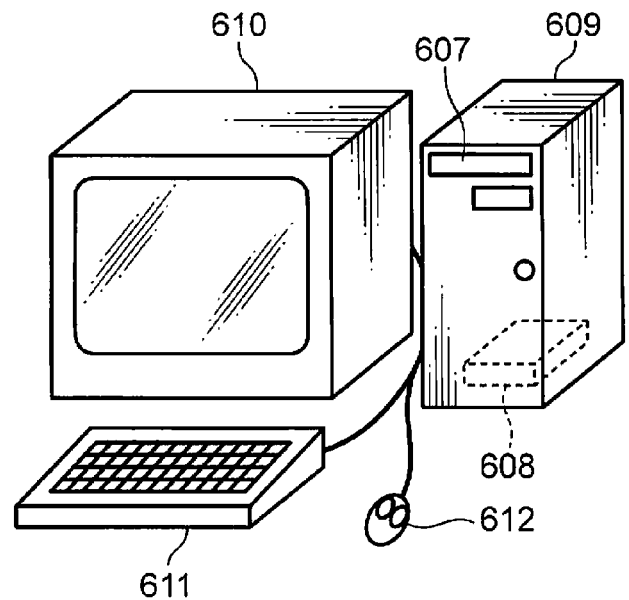
FIG. 15 is a schematic perspective view illustrating the entire configuration of the computer in Embodiment 4 of the present invention.

This embodiment relates to a computer that is an example of an information processing device equipped with the optical disk device 607 according to the above-described Embodiment 3. FIG. 15 is a schematic perspective view illustrating the entire configuration of the computer in Embodiment 4 of the present invention.

The computer 609 shown in FIG. 15 is provided with the optical disk device 607 according to Embodiment 3, an input device such as a keyboard 611 and a mouse 612 for inputting information, a computation device 608 constituted, for example, by a central processing unit (CPU) that performs computations on the basis of the information inputted from the input device or information read from the optical disk device 607, and an output device 610 constituted by a cathode-ray tube or a liquid crystal display device that displays the information on the results of computations performed by the computation device 608. The computation device 608 is an example of an information processing unit that processes information to be recorded on the optical disk device 607 and/or information reproduced from the optical disk device 607. A printer that prints information such as the results obtained by computations in the computation device 608 may be used as the output device 610.

The computer 609 is equipped with the optical disk device 607 according to Embodiment 3 and the rise in temperature of the objective lens 1 can be inhibited and leveled even when a resin objective lens is used. As a result, in the present embodiment, it is possible to obtain a good focusing characteristic, realize stable high-density recording and reproduction, and reduce cost. Therefore, the computer has a wide range of applications.

Further, the computer 609 may be equipped with wire or wireless input/output terminals for taking in the information to be recorded on the optical disk device 607 and outputting the information read by the optical disk device 607 to the outside. In such a case, the computer may be used as a shared information server (optical disk server) for exchanging information with a network, that is a plurality of devices, for example, a computer, a telephone, and a TV tuner. In this case, a wide range of applications is possible because different optical disks can be stably recorded and reproduced.

Further, by providing a changer for loading/unloading a plurality of optical disks in/from the optical disk device 607, it is possible to record and store large volumes of information.

Embodiment 5

Figure 16:
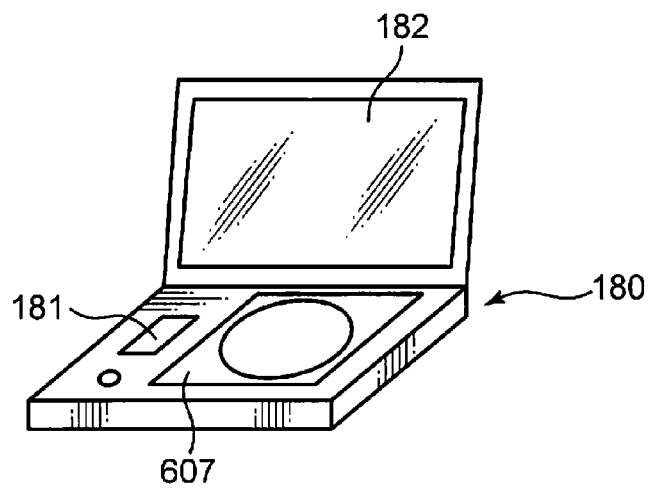
FIG. 16 is a schematic perspective view illustrating the entire configuration of the optical disk player in Embodiment 5 of the present invention.

The present embodiment relates to an optical disk player which is an example of an information processing device equipped with the optical disk device 607 according to the above-described Embodiment 3. FIG. 16 is a schematic perspective view illustrating the entire configuration of the optical disk player in Embodiment 5 of the present invention.

Referring to FIG. 16, an optical disk player 180 includes the optical disk device 607 according to Embodiment 3, and a decoder 181 that converts information signals obtained from the optical disk device 607 into image signals. The decoder 181 is an example of an information processing unit that processes information to be recorded on the optical disk device 607 and/or information reproduced from the optical disk device 607.

Further, where a position sensor such as GPS and a central processing unit (CPU) are added, the present configuration can be also used as a car navigation system. The configuration additionally including a display device 182 such as a liquid crystal monitor may be also used. In this case, the display device 182 is constituted by a liquid crystal display device and displays image signals converted by the decoder 181.

With such a configuration, the optical disk player 180 includes the optical device 607 according to Embodiment 3, and the rise in temperature of the objective lens 1 can be inhibited and leveled even when a resin objective lens is used. As a result, in the present embodiment, it is possible to obtain a good focusing characteristic, realize stable high-density recording and reproduction, and reduce cost. Therefore, the optical disk player has a wide range of applications.

Embodiment 6

Figure 17:
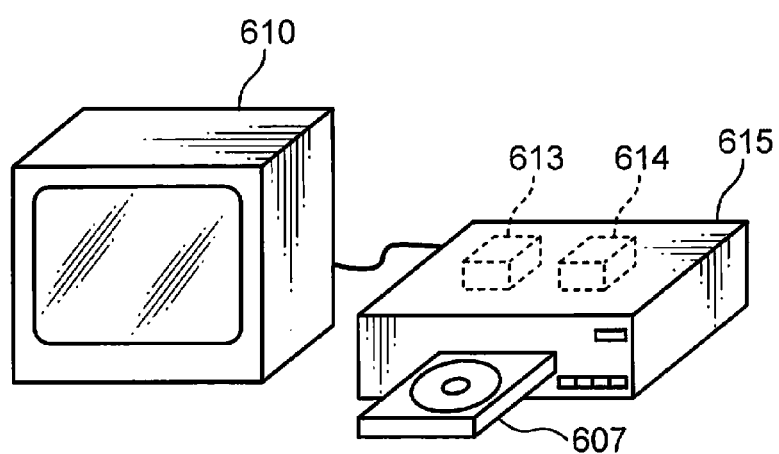
FIG. 17 is a schematic perspective view illustrating the entire configuration of the optical disk recorder in Embodiment 6 of the present invention.
Figure 18:
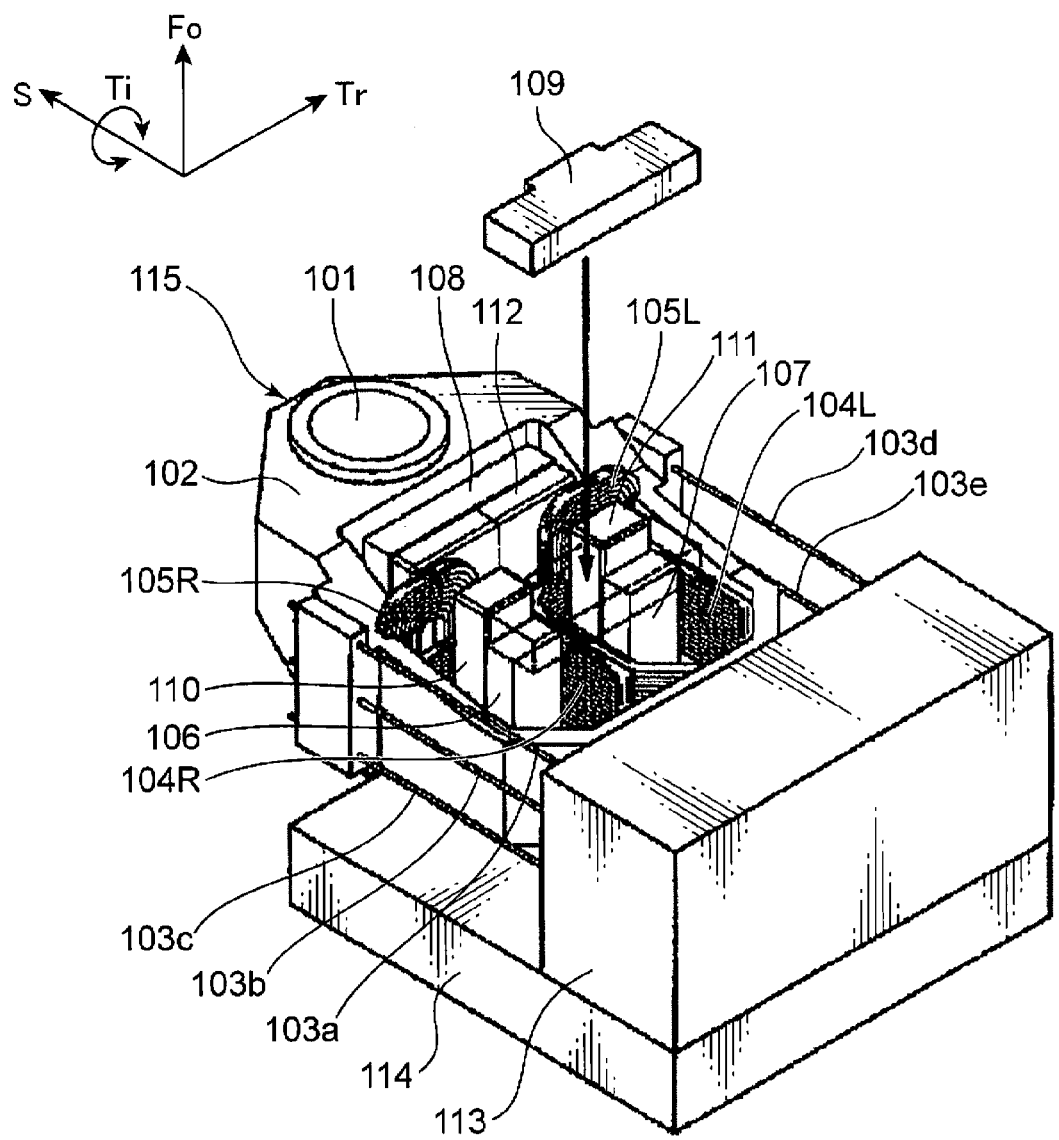
FIG. 18 is a perspective view illustrating the configuration of the objective lens actuator of the conventional optical pickup device.

The present embodiment relates to an optical disk recorder which is an example of an information processing device equipped with the optical disk device 607 according to the above-described Embodiment 3. FIG. 17 is a schematic perspective view illustrating the entire configuration of the optical disk recorder in Embodiment 6 of the present invention.

An optical disk recorder 615 shown in FIG. 17 is equipped with the optical disk device 607 according to Embodiment 3 and a recording signal processing circuit 613 that converts image signals into information signals for recording image information by the optical disk device 607 on the optical disk. The recording signal processing circuit 613 is an example of an information processing unit that processes information to be recorded by the optical disk device 607.

Further, it is desirable that the optical disk recorder 615 also have a reproduction signal processing circuit 614 that converts information signals obtained from the optical disk device 607 into image signals. The reproduction signal processing circuit 614 is an example of information processing unit that processes information reproduced from the optical disk device 607. With such a configuration, the portions that have already been recorded can be also reproduced. The optical disk recorder 615 may also include an output device 610 such as a cathode-ray tube or a liquid crystal display device that displays information.

With the above-described configuration, the optical disk recorder 615 includes the optical disk device 607 of Embodiment 3, and although a resin objective lens is used, the rise in temperature of the objective lens 1 can be inhibited more efficiently and leveled. As a result, the present embodiment makes it possible to obtain good focusing characteristic, realize stable high-density recording and reproduction, and reduce cost. Therefore, the optical disk recorder has a wide range of applications.

The present invention can be summarized in the following manner on the basis of the above-described embodiments. Thus, the optical pickup device in accordance with the present invention comprises: a light source that emits a light beam of a predetermined wavelength; a single objective lens that focuses the light beam from the light source to irradiate a disk-shaped recording medium; an objective lens actuator that drives the objective lens; a photodetector that receives, via the objective lens, a light beam reflected by a recording surface of the disk-shaped recording medium to converts the received light into an electric signal; and an optical base that holds the light source, the objective lens actuator, and the photodetector, wherein the objective lens actuator comprises: a lens holder that holds the objective lens; a support mechanism that supports the lens holder so that the lens holder is movable in a focusing direction, which is a direction perpendicular to the disk-shaped recording medium, and a tracking direction, which is a radial direction of the disk-shaped recording medium; a focusing coil that is fixed to the lens holder and drives the lens holder in the focusing direction; a tracking coil that is fixed to the lens holder and drives the lens holder in the tracking direction; an actuator base that holds one end of the support mechanism; and a magnet that is held on the actuator base and disposed at a position opposing the focusing coil and/or the tracking coil, and also applies a magnetic field to the focusing coil and/or the tracking coil, a first gap and a second gap are formed between the lens holder and the objective lens, and when the disk-shaped recording medium rotates clockwise, and in an xy plane in which the center of the objective lens is taken as an origin, the tracking direction is taken as an y axis, and the tangential direction of tracks of the disk-shaped recording medium is taken as an x axis, a center side of the disk-shaped recording medium is taken as a positive direction for the y axis, a direction obtained by rotating the positive direction of the y axis clockwise through 90° is taken as a positive direction for the x axis, and four regions obtained by dividing the xy plane by the x axis and the y axis are taken as a first quadrant, a second quadrant, a third quadrant, and a fourth quadrant in the counterclockwise direction, the first gap is positioned at least in the first quadrant, and the second gap is positioned at least in the third quadrant.

In such an optical pickup device, the first gap formed between the lens holder and the objective lens is positioned in the first quadrant and the second gap is positioned in the third quadrant of the xy plane in which the center of the objective lens is taken as an origin, the tracking direction is taken as the y axis, and the tangential direction of the tracks of the disk-shaped recording medium is taken as the x axis. In this case, the disk-shaped recording medium rotates clockwise in the top view thereof. Therefore, a spiral air flow is generated by this rotation in the vicinity of the surface of the disk-shaped recording medium, and an air current from the first quadrant to the third quadrant is generated on the periphery of the objective lens. As a result, this air flow comes through so as to pass through from the first gap provided in the first quadrant to the second gap provided in the third quadrant, and the heat can be efficiently dissipated from the entire surface on the lower side of the objective lens.

As a result, even when the heat generated by the focusing coils and/or tracking coils flows in from the bonding section of the lens holder and the objective lens, the temperature distribution of the objective lens can be leveled, the amount of temperature rise can be inhibited, and good focusing characteristic can be obtained and stable high-density recording and reproduction can be realized even with the objective lens compatible with a plurality of disk-shaped recording media, for example, BD and DVD (and/or CD). In addition, the device cost can be reduced and the device can be reduced in size and thickness.

It is preferred that the first gap be positioned within a range from ±30° to ±60° centered on a straight line obtained by rotating a positive-direction portion of the x axis counterclockwise through 30°, and the second gap is positioned within a range from ±30° to ±60° centered on a straight line obtained by rotating the positive-direction portion of the x axis counterclockwise through 210°.

In this case, the flow of the air current created by the rotation of the disk-shaped recording medium is substantially centered on a straight line obtained by rotating the positive-direction portion of the x axis counterclockwise through 30° and the air current flows from the first quadrant to the third quadrant. Therefore, this air current smoothly passes through from the first gap disposed so as to be centered on a straight line obtained by rotating the positive-direction portion of the x axis counterclockwise through 30° toward the second gap disposed so as to be centered on a straight line obtained by rotating the positive-direction portion of the x axis counterclockwise through 210°, and the objective lens can be efficiently cooled. In addition, since the range of the first gap and the second gap is from ±30° to ±60°, the objective lens can be sufficiently cooled and the objective lens can be accurately fixed to the lens holder.

It is preferred that the objective lens be fixed to a first fixed section and a second fixed section of the lens holder, the first fixed section be positioned at least in the second quadrant, and the second fixed section be positioned at least in the fourth quadrant.

In such a case, the objective lens can be accurately fixed to the lens holder, while sufficiently cooling the objective lens with good efficiency.

It is preferred that the lens holder have a first lens protector and a second lens protector that prevent the objective lens and the disk-shaped recording medium from coming into contact with each other; and the first lens protector be positioned in the first quadrant, and the second lens protector be positioned in the third quadrant.

In this case, even though the first fixed section is disposed in the second quadrant and the second fixed section is disposed in the fourth quadrant, the inertia momentum of the movable body can be balanced by the first and second lens protectors, and therefore unnecessary rolling of the movable body can be prevented.

It is preferred that the tracking coil include: a first tracking coil fixed to a center of one side surface of the lens holder perpendicular to the x axis; and a second tracking coil fixed to a center of the other side surface of the lens holder perpendicular to the x axis.

In such a case, the heat generated by the first and second tracking coils can be efficiently discharged to the outside by the air current created by the rotation of the disk-shaped recording medium.

It is preferred that the focusing coil include: a first focusing coil fixed to a portion of one side surface of the lens holder perpendicular to the x axis, the portion being positioned in the first quadrant; and a second focusing coil fixed to a portion of the other side surface of the lens holder perpendicular to the x axis, the portion being positioned in the third quadrant.

In such a case, a set of the first focusing coil and the first tracking coil and a set of the second focusing coil and the second tracking coil are disposed close to each other. Therefore, by disposing the two sets along the flow of the air current in a state with a centralized arrangement of heat generation sources, it is possible to cool directly the first and second focusing coils and the first and second tracking coils which are the heat generation sources. In addition, since the heat conduction path from the centralized heat generation sources of the lens holder to the objective lens can be also cooled, the inflow of heat to the objective lens can be inhibited with good efficiency.

It is preferred that the magnet include: a first magnet that has a magnetizing boundary surface on the x axis, applies magnetic fields in the opposite directions to two sides of the first tracking coil that are substantially parallel to the optical axis of the objective lens, and applies a magnetic field to a side that is closer to the disk-shaped recording medium, from among the two sides of the first focusing coil that are substantially parallel to the y axis; and a second magnet that has a magnetizing boundary surface on the x axis, applies magnetic fields in the opposite directions to two sides of the second tracking coil that are substantially parallel to the optical axis of the objective lens, and applies a magnetic field to a side that is closer to the disk-shaped recording medium, from among the two sides of the second focusing coil that are substantially parallel to the y axis.

In such a case, the first and second focusing coils and the first and second tracking coils are disposed close to each other and the drive sources are centralized. Therefore, the size of the first and second magnets in the y axis direction can be reduced, the volume of the first and second magnets can be decreased, and the cost of the optical pickup device can be reduced. Further, since the first and second focusing coils are disposed below the objective lens, the first and second focusing coils, which are heat generation sources, are separated from the objective lens and the rise in temperature of the objective lens can be inhibited.

It is preferred that the focusing coil include: a first focusing coil fixed to a portion of one side surface of the lens holder perpendicular to the x axis, the portion being positioned in the first quadrant; a second focusing coil fixed to a portion of the other side surface of the lens holder perpendicular to the x axis, the portion being positioned in the second quadrant; a third focusing coil fixed to a portion of the other side surface of the lens holder, the portion being positioned in the third quadrant; and a fourth focusing coil fixed to a portion of the one side surface of the lens holder, the portion being positioned in the fourth quadrant.

In this case, the first to fourth focusing coils can be disposed in a balanced manner such that the center of the objective lens becomes the center of gravity, and the set of the first and fourth focusing coils and the first tracking coil and the set of the second and third focusing coil and the second tracking coil are disposed close to each other. Therefore, the sets are disposed along the flow of the air current in a state with a centralized arrangement of heat generation sources, thereby making it possible to cool directly the first to fourth focusing coils and the first and second tracking coils, which are the heat generation sources. Further, since the heat conduction path from the centralized heat generation sources of the lens holder to the objective lens can be also cooled, the inflow of heat to the objective lens can be efficiently inhibited.

It is preferred that the magnet include: a first magnet that has a magnetizing boundary surface on the x axis, applies magnetic fields in the opposite directions to two sides of the first tracking coil that are substantially parallel to the optical axis of the objective lens, and applies a magnetic field to a side that is closer to the disk-shaped recording medium, from among the two sides of the first focusing coil that are substantially parallel to the y axis, and to a side that is closer to the disk-shaped recording medium, from among the two sides of the fourth tracking coil that are substantially parallel to the y axis; and a second magnet that has a magnetizing boundary surface on the x axis, applies magnetic fields in the opposite directions to two sides of the second tracking coil that are substantially parallel to the optical axis of the objective lens, and applies a magnetic field to a side that is closer to the disk-shaped recording medium, from among the two sides of the second focusing coil that are substantially parallel to the y axis, and to a side that is closer to the disk-shaped recording medium, from among the two sides of the third focusing coil that are substantially parallel to the y axis.

In such a case, since the first to fourth focusing coils are disposed below the objective lens, the first to fourth focusing coils, which are the heat generation sources, can be separated from the objective lens and the rise in temperature of the objective lens can be inhibited. Further, since a large drive force can be generated by the first to fourth focusing coil, a highly accurate focusing servo can be realized.

It is preferred that the objective lens include a resin lens formed by resin molding.

In such a case, a good focusing characteristic can be obtained, stable high-density recording and reproduction can be realized, the device cost can be reduced and the device can be reduced in size and thickness even though a resin lens compatible with a plurality of disk-shaped recording media, for example, BD and DVD (and/or CD), is used as the objective lens.

It is preferred that the objective lens be a multiple-wavelength compatible objective lens corresponding to a plurality of wavelengths including at least a wavelength of about 405 nm.

In such a case, a good focusing characteristic can be obtained, stable high-density recording and reproduction can be realized, the device cost can be reduced and the device can be reduced in size and thickness even though a multiple-wavelength compatible objective lens compatible with BD and another disk-shaped recording medium is used as the objective lens.

It is preferred that the multiple-wavelength compatible objective lens be a three-wavelength compatible objective lens corresponding to three wavelengths including a wavelength of about 660 nm and a wavelength of about 780 nm in addition to a wavelength of about 405 nm.

In such a case, a good focusing characteristic can be obtained, stable high-density recording and reproduction can be realized, the device cost can be reduced and the device can be reduced in size and thickness even though a multiple-wavelength compatible objective lens compatible with BD, DVD, and CD is used as the objective lens.

It is preferred that the dimension from a lower surface of the optical base to the disk-shaped recording medium be equal to or less than 11 mm.

In such a case, the inflow of heat to the objective lens can be efficiently inhibited even in use of a lens holder having a small heat capacity, a good focusing characteristic can be obtained, and a thin pickup device realizing stable high-density recording and reproduction can be realized.

The optical information device in accordance with the present invention comprises the above-described optical pickup device, a motor that rotates the disk-shaped recording medium; and a control unit that controls the motor and the optical pickup device on the basis of a signal obtained from the optical pickup device.

In such an optical information device, the rise in temperature of the objective lens can be efficiently inhibited and leveled despite the inflow of heat generated by the focusing coils and tracking coils. Therefore, a good focusing characteristic can be obtained and an optical information device that can realize stable high-density recording and reproduction and can be reduced in cost can be realized even though the objectives lens is a resin objective lens.

The information processing device in accordance with the present invention comprises the above-described optical information device and an information processing unit that processes information recorded on the optical information device and/or information reproduced from the optical information device.

Such an information processing device includes the above-described optical information device, and the rise in temperature of the objective lens therein can be efficiently inhibited and leveled even when the objective lens is made from a resin. Therefore, a good focusing characteristic can be obtained, stable high-density recording and reproduction can be realized, and cost can be reduced.

The optical pickup device, optical information device and information processing device in accordance with the present invention enable high-density stable recording and/or reproduction of information on/from optical disks of a plurality of types with different correspondence wavelengths. Therefore, those devices can be used in high-capacity memory devices for computers, servers, optical disk players, and optical disk recorders which are possible applications thereof.

The invention claimed is:

1. An optical pickup device comprising:
a light source that emits a light beam of a predetermined wavelength;
a single objective lens that focuses the light beam from the light source to irradiate a disk-shaped recording medium;
an objective lens actuator that drives the objective lens;
a photodetector that receives, via the objective lens, a light beam reflected by a recording surface of the disk-shaped recording medium to converts the received light into an electric signal; and
an optical base that holds the light source, the objective lens actuator, and the photodetector,
wherein the objective lens actuator comprises:
a lens holder that holds the objective lens;
a support mechanism that supports the lens holder so that the lens holder is movable in a focusing direction, which is a direction perpendicular to the disk-shaped recording medium, and a tracking direction, which is a radial direction of the disk-shaped recording medium;
a focusing coil that is fixed to the lens holder and drives the lens holder in the focusing direction;
a tracking coil that is fixed to the lens holder and drives the lens holder in the tracking direction;
an actuator base that holds one end of the support mechanism; and
a magnet that is held on the actuator base and disposed at a position opposing the focusing coil and/or the tracking coil, and also applies a magnetic field to the focusing coil and/or the tracking coil,
a first gap and a second gap are formed between the lens holder and the objective lens,
when the disk-shaped recording medium rotates clockwise, and in an xy plane in which the center of the objective lens is defined as an origin, the tracking direction is defined as an y axis, and the tangential direction of tracks of the disk-shaped recording medium is defined as an x axis, a center side of the disk-shaped recording medium is defined as a positive direction for the y axis, a direction obtained by rotating the positive direction of the y axis clockwise through 90° is defined as a positive direction for the x axis, and four regions obtained by dividing the xy plane by the x axis and the y axis are defined as a first quadrant, a second quadrant, a third quadrant, and a fourth quadrant in the counterclockwise direction, the first gap is positioned at least in the first quadrant, and the second gap is positioned at least in the third quadrant,
a center of the first gap is positioned on a straight line obtained by rotating a positive-direction portion of the x axis counterclockwise through 30°, and
a center of the second gap is positioned on a straight line obtained by rotating a positive-direction portion of the x axis counterclockwise through 210°.

2. The optical pickup device according to claim 1, wherein the first gap is positioned within a range from ±30° to ±60° centered on the straight line obtained by rotating the positive-direction portion of the x axis counterclockwise through 30°, and the second gap is positioned within a range from ±30° to ±60° centered on the straight line obtained by rotating the positive-direction portion of the x axis counterclockwise through 210°.

3. The optical pickup device according to claim 1, wherein the objective lens is fixed to a first fixed section and a second fixed section of the lens holder; and the first fixed section is positioned at least in the second quadrant, and the second fixed section is positioned at least in the fourth quadrant.

4. The optical pickup device according to claim 3, wherein the lens holder has a first lens protector and a second lens protector that prevent the objective lens and the disk-shaped recording medium from coming into contact with each other; and the first lens protector is positioned in the first quadrant, and the second lens protector is positioned in the third quadrant.

5. The optical pickup device according to claim 1, wherein the tracking coil includes:
a first tracking coil fixed to a center of one side surface of the lens holder perpendicular to the x axis; and
a second tracking coil fixed to a center of the other side surface of the lens holder perpendicular to the x axis.

6. The optical pickup device according to claim 5, wherein the focusing coil includes:
a first focusing coil fixed to a portion of one side surface of the lens holder perpendicular to the x axis, the portion being positioned in the first quadrant; and
a second focusing coil fixed to a portion of the other side surface of the lens holder perpendicular to the x axis, the portion being positioned in the third quadrant.

7. The optical pickup device according to claim 6, wherein the magnet includes:
a first magnet that has a magnetizing boundary surface on the x axis, applies magnetic fields in the opposite directions to two sides of the first tracking coil that are substantially parallel to the optical axis of the objective lens, and applies a magnetic field to a side that is closer to the disk-shaped recording medium, from among the two sides of the first focusing coil that are substantially parallel to the y axis; and
a second magnet that has a magnetizing boundary surface on the x axis, applies magnetic fields in the opposite directions to two sides of the second tracking coil that are substantially parallel to the optical axis of the objective lens, and applies a magnetic field to a side that is closer to the disk-shaped recording medium, from among the two sides of the second focusing coil that are substantially parallel to the y axis.

8. The optical pickup device according to claim 5, wherein the focusing coil includes:
a first focusing coil fixed to a portion of one side surface of the lens holder perpendicular to the x axis, the portion being positioned in the first quadrant;
a second focusing coil fixed to a portion of the other side surface of the lens holder perpendicular to the x axis, the portion being positioned in the second quadrant;
a third focusing coil fixed to a portion of the other side surface of the lens holder, the portion being positioned in the third quadrant; and
a fourth focusing coil fixed to a portion of the one side surface of the lens holder, the portion being positioned in the fourth quadrant.

9. The optical pickup device according to claim 8, wherein the magnet includes:
a first magnet that has a magnetizing boundary surface on the x axis, applies magnetic fields in the opposite directions to two sides of the first tracking coil that are substantially parallel to the optical axis of the objective lens, and applies a magnetic field to a side that is closer to the disk-shaped recording medium, from among the two sides of the first focusing coil that are substantially parallel to the y axis, and to a side that is closer to the disk-shaped recording medium, from among the two sides of the fourth focusing coil that are substantially parallel to the y axis; and
a second magnet that has a magnetizing boundary surface on the x axis, applies magnetic fields in the opposite directions to two sides of the second tracking coil that are substantially parallel to the optical axis of the objective lens, and applies a magnetic field to a side that is closer to the disk-shaped recording medium, from among the two sides of the second focusing coil that are substantially parallel to the y axis, and to a side that is closer to the disk-shaped recording medium, from among the two sides of the third focusing coil that are substantially parallel to the y axis.

10. The optical pickup device according to claim 1, wherein the objective lens includes a resin lens formed by resin molding.

11. The optical pickup device according to claim 1, wherein the objective lens is a multiple-wavelength compatible objective lens corresponding to a plurality of wavelengths including at least a wavelength of about 405 nm.

12. The optical pickup device according to claim 11, wherein the multiple-wavelength compatible objective lens is a three-wavelength compatible objective lens corresponding to three wavelengths including a wavelength of about 660 nm and a wavelength of about 780 nm in addition to a wavelength of about 405 nm.

13. The optical pickup device according to claim 1, wherein the dimension from a lower surface of the optical base to the disk-shaped recording medium is equal to or less than 11 mm.

14. An optical information device comprising:
the optical pickup device according to claim 1;
a motor that rotates the disk-shaped recording medium; and
a control unit that controls the motor and the optical pickup device on the basis of a signal obtained from the optical pickup device.

15. An information processing device comprising:
the optical information device according to claim 14; and
an information processing unit that processes information recorded on the optical information device and/or information reproduced from the optical information device.

* * * * *